(12) United States Patent
Sulcer, Jr.

(10) Patent No.: US 9,884,638 B1
(45) Date of Patent: Feb. 6, 2018

(54) HAND TRUCK FOR PERCUSSION DRUM SET AND RELATED ACCESSORIES

(71) Applicant: John L. Sulcer, Jr., Newark, OH (US)

(72) Inventor: John L. Sulcer, Jr., Newark, OH (US)

( * ) Notice: Subject to any disclaimer, the term of this patent is extended or adjusted under 35 U.S.C. 154(b) by 0 days.

(21) Appl. No.: 15/238,932

(22) Filed: Aug. 17, 2016

Related U.S. Application Data

(60) Provisional application No. 62/282,995, filed on Aug. 18, 2015.

(51) Int. Cl.
| | |
|---|---|
| *B62B 1/06* | (2006.01) |
| *B62B 1/14* | (2006.01) |
| *B62B 1/22* | (2006.01) |
| *B62B 3/04* | (2006.01) |
| *B62B 1/26* | (2006.01) |
| *B62B 1/18* | (2006.01) |
| *B62B 5/00* | (2006.01) |
| *B62B 5/06* | (2006.01) |
| *B62B 1/00* | (2006.01) |

(52) U.S. Cl.
CPC .............. *B62B 1/264* (2013.01); *B62B 1/008* (2013.01); *B62B 1/18* (2013.01); *B62B 1/22* (2013.01); *B62B 1/268* (2013.01); *B62B 5/0013* (2013.01); *B62B 5/06* (2013.01)

(58) Field of Classification Search
CPC .... B62B 1/06; B62B 1/14; B62B 1/22; B62B 3/04
See application file for complete search history.

(56) References Cited

U.S. PATENT DOCUMENTS

| | | | | |
|---|---|---|---|---|
| 3,114,468 | A * | 12/1963 | Quase | B65D 88/005 220/693 |
| 6,485,037 | B1 | 11/2002 | Sucler, Jr. | |
| 6,550,860 | B2 * | 4/2003 | Lombardi | A47C 9/08 220/915.2 |
| 8,646,640 | B2 * | 2/2014 | Faris | B65D 11/02 220/703 |
| 9,745,085 | B2 * | 8/2017 | Pawlowski | B65B 3/04 |
| 2004/0232016 | A1 * | 11/2004 | Dietrich | A63B 55/404 206/315.3 |

* cited by examiner

*Primary Examiner* — Bryan Evans
(74) *Attorney, Agent, or Firm* — Donald J. Ersler

(57) ABSTRACT

Accordingly, a hand truck for percussion drums and related accessories of the invention enables storage, transport, protection, and control of a plurality of percussion drums and their related accessories. The hand truck for percussion drums and related accessories is comprised of a body panel consisting of individual drum compartments of varying dimensions sized to accommodate preselected percussion drums of corresponding varying dimensions which are protectively releasably received into the compartments thru the use of support strips. A cymbal storage rod assembly is included to facilitate the control and storage of a plurality of percussion cymbals. Said body panel further supporting a cover onto which a plurality of drum accessory and drum pedal storage compartments may be attached. Support brackets with end closures support the body panel each employing handles to facilitate maneuvering along with wheels on the front end to enable transport.

18 Claims, 17 Drawing Sheets

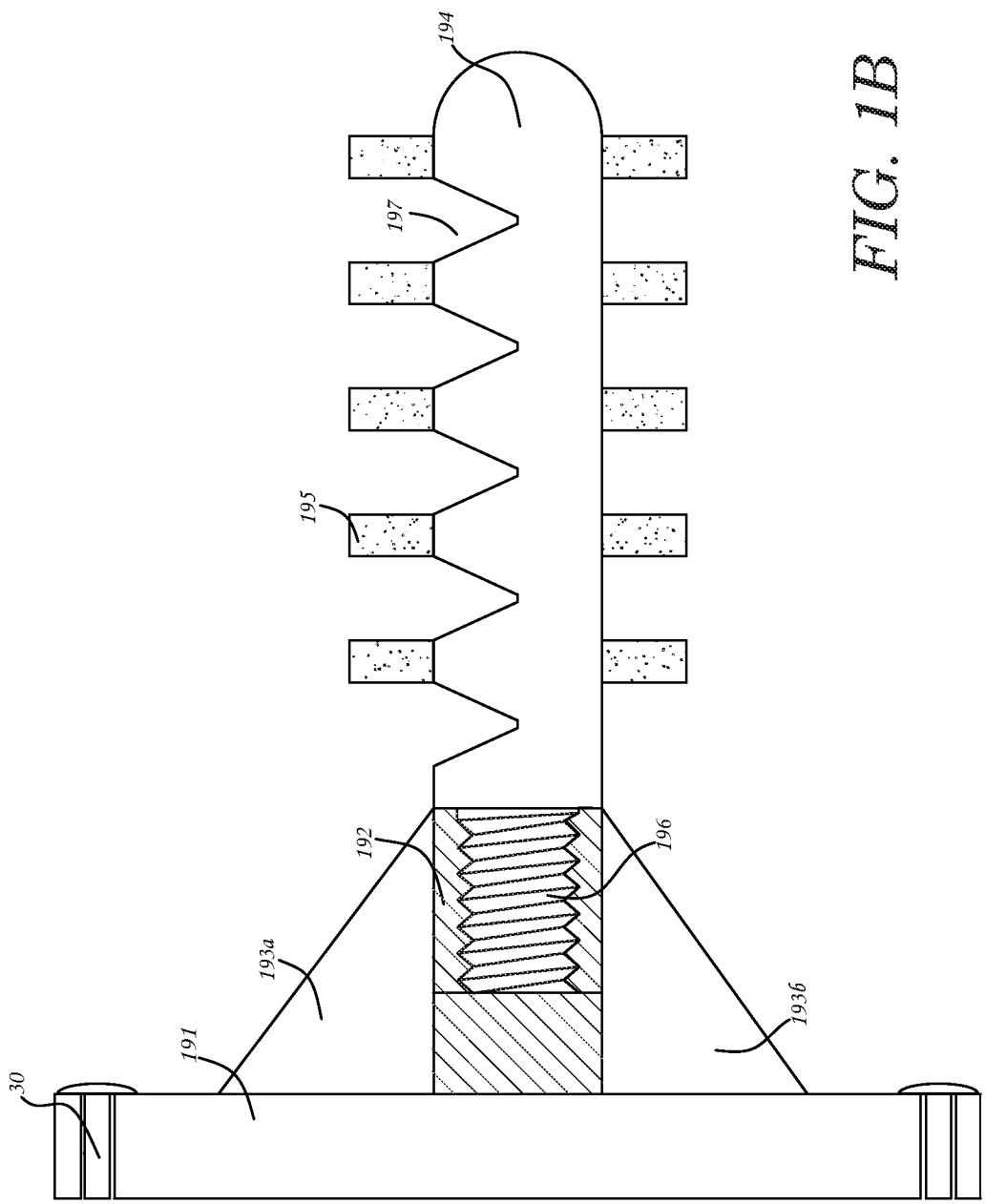

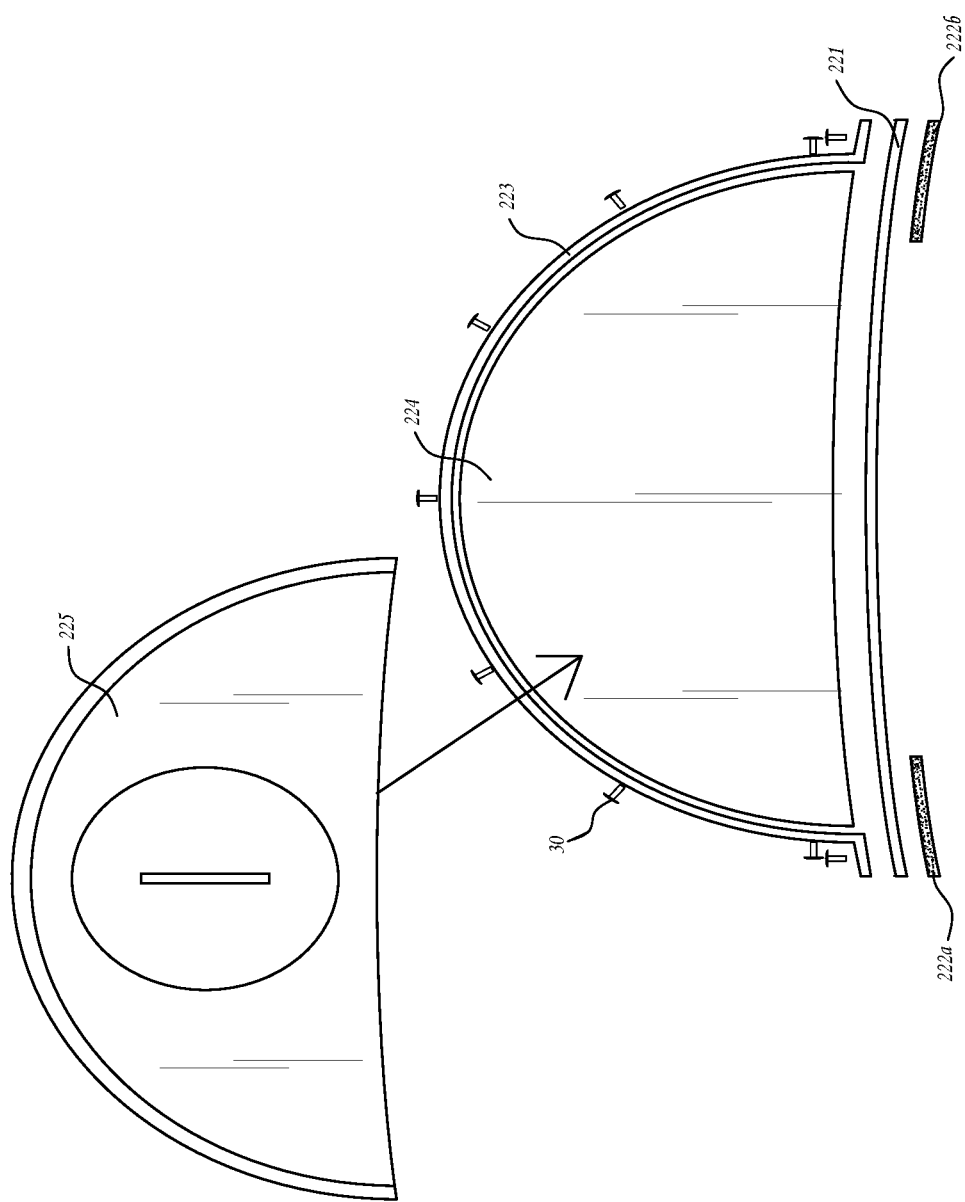

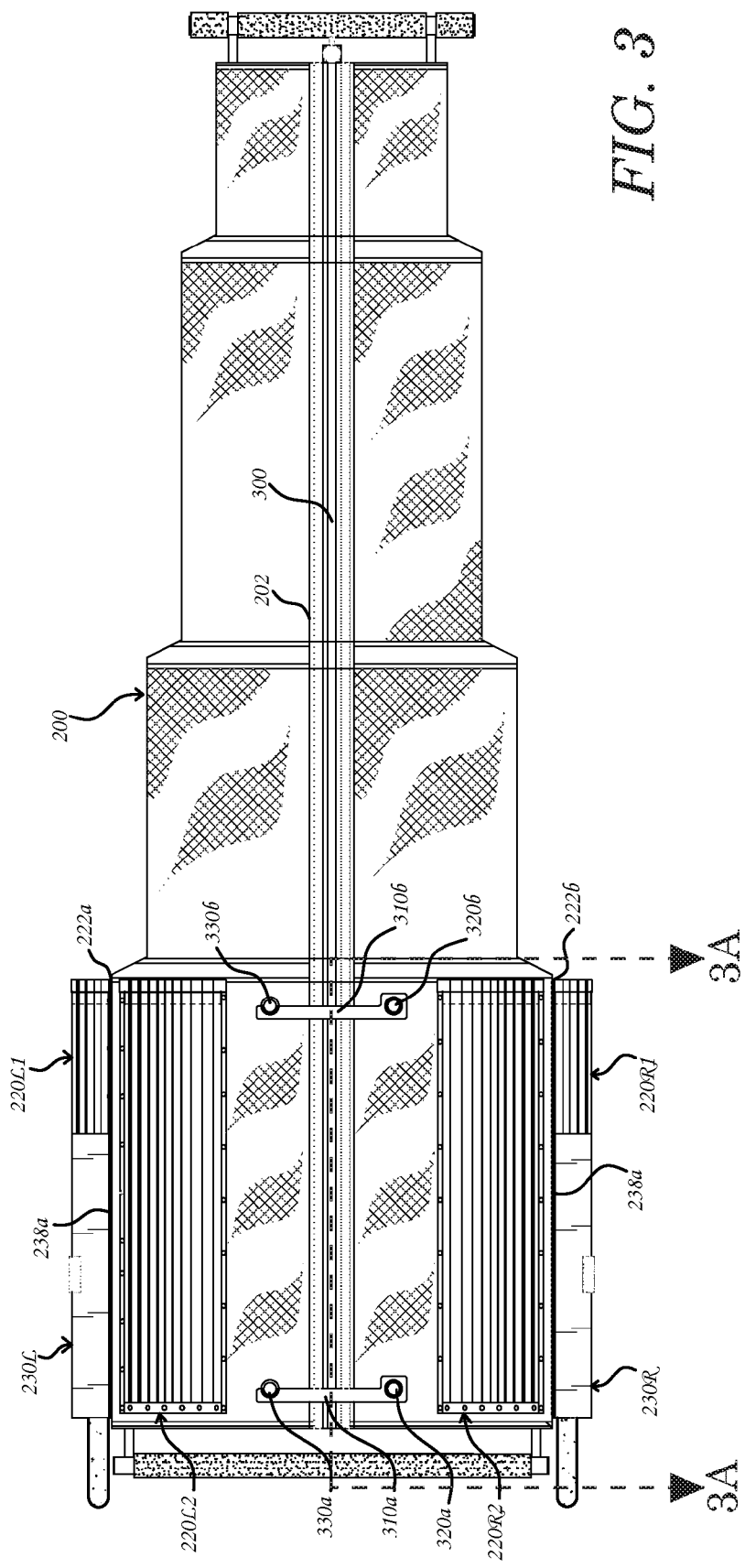

HAND TRUCK FOR PERCUSSION DRUM SET AND RELATED ACCESSORIES

CROSS-REFERENCES TO RELATED APPLICATIONS

This is a utility patent application taking priority from provisional application No. 62/282,995 filed on Aug. 18, 2015.

BACKGROUND OF THE INVENTION

Field of the Invention

The present invention relates generally to a wheeled conveyance and more particularly to integrated carts, dollies, or cases and the like for percussion drums and related accessories.

Discussion of the Prior Art

A drummer, being one who plays drums, will commonly use a number of drums and cymbals in the performance of music. The drums and cymbals used may be said to comprise a drum set. Each drum and cymbal in a drum set may be an expensive instrument individually. Thus, the drum set may be all the more expensive as well being fragile in some aspects especially with respect to the outward decorative finish or coating. Accordingly, one will prefer to care for the drum set and will usually transport and store the drum set in protective cases, that each includes a body and lid, and in some instances, optional foam support rings located at the top and bottom portions of the drum case. Further, stands and other accessories are typically employed with a drum set to facilitate the playing of the drum set in a drummer's desired configuration and arrangement. One may readily see, then the unwieldy number of respective components and their protective cases that accompany a drum set. Given the additional task of opening, preparing, loading, and closing of the protective cases, not to mention transporting the cases while laden with the drums and accessories that comprise a drum set. One may further appreciate a great desire to control and simplify the handling and use of the drums, cymbals, accessories, and cases.

Generally, hand trucks are comprised of an open framework configuration with side rails along with opposing receiving structural adjoining braces which are spaced vertically along the frame in addition to forwardly disposed adjacent nose portions supported by wheels, generally adapted for use in transporting various objects such as boxes, cartons, and cylinders with the load being supported by the vertically inclined framework and the forwardly disposed nose portion. There are also other types of hand trucks with an open framework configuration along with various assemblies and compartments to accommodate specific applications such as transporting laundry, garbage cans, and welding equipment. Hand trucks intended for curvilinear loads are normally provided with metal arcuate structural adjoining braces, and usually without any type of protection for fragile loads. Generally, owners of these hand trucks use them for industrial purposes such as transporting heavy barrels, kegs, or cylinders, and curvilinear loads of an industrial nature are usually not fragile, and do not require any type of protection for the load surface. Since percussion drums, cymbals, and related accessories are somewhat irregular and fragile in design, typical industrial hand trucks with standard arcuate structural adjoining braces are not suitable for transporting percussion drums, cymbals, and related accessories due to the overall design and dimensions of the hand truck, and also due to jarring movement the percussion drums and accessories against the metal adjoining braces during use which would cause internal and surface damage to the percussion drums and related accessories. In regard to standard percussion drum cases, commonly they consist of a cylinder and handle with an accompanying lid or cover sized to facilitate closure which when assembled, comprises a type of protective drum case. There is a dimensionally uniform closure on the lower half, while the upper half embodies an aperture portion which inwardly accepts a certain percussion drum of a corresponding smaller diameter and in some instances, optional foam support pieces which offers additional protection for the drum especially during jarring impacts while loaded inside of the protective case. Once the drum is positioned within the case a lid is installed and is secured with a type of latching or securing mechanism. The completed assembled protective drum case provides adequate protection during transport for a certain percussion drum, wherein the load is supported by the upper and lower half of the case being aided by the closure of the lid while nested inside and optionally inside of the foam support rings. Typically these cases are cumbersome to assemble and disassemble, and are difficult to store when not in use. The protective cases are usually physically transported by the drummer while laden with the drum inside of the case. The drummer must endure the added weight and inconvenience while transferring the loaded cases in pairs to a motor vehicle parked out of doors and usually up an incline or stairs or over a great distance. Given the size and weight of an entire drum set it is not possible to move the entire drum set in one movement cycle to a motor vehicle out of doors including when protective cases are used during the movement cycle.

SUMMARY OF THE INVENTION

The present invention provides a hand truck for percussion drum set and related accessories (hand truck), which makes it easier to store a percussion drum set. A hand truck facilitates storage, protection, control, and transport of drums, cymbals, and related percussion accessories. The hand truck for percussion drums and related accessories of the invention has an arcuate semi-cylindrical body panel with attached semi-circular end plates which includes a cymbal storage rod assembly as well as a plurality semi-cylindrical individually sized drum storage compartments of varying dimensional diameter within the unibody panel. The cymbal storage rod assembly is comprised of a mounting base with an attached cymbal storage rod. The drum compartments are sized to correspond to the outermost dimensions of a preselected percussion drum, which is protectively releasably received into the corresponding compartment by use of drum support strips. Also included is a cover, which spans the entire compartmented areas and conforms to the uppermost dimensions of the percussion drums and is fastened around the upper periphery of the body panel along with a zippered closure positioned in the center. Further compartments may also be provided for accessories however these compartments are optional, removable, and may be omitted with the hand truck being operated without the accessory storage compartments.

The invention is a new and useful concept of an integrated wheeled conveyance for percussion drums and related accessories that provides for storage and movement of percussion drums, cymbals and related accessories.

Load supporting rubber or foam drum support strips along with a cymbal storage rod assembly are secured and nested inside of the protective arcuate semi-cylindrical body panel attached to arcuate semi-circular adjoining brackets with the front adjoining bracket being further supported by wheels and the rearward adjoining bracket being supported by a leveling device. The invention is adapted for use in transporting a certain percussion drum set to or from a given location of musical performance either in a somewhat vertical and angled movement position, or a horizontal load/unload position. A first handle located at the rear of the hand truck is included to propel and maneuver the hand truck, while a second handle located at the front of the hand truck is provided to aid in stabilizing or maneuvering the hand truck during more challenging transport cycles.

A new and useful design of a hand truck for storage and transport of percussion drums, cymbals, and related accessories that incorporates a rearward propelling handle, and a frontal maneuvering handle supported by wheels attached to arcuate semi-circular adjoining brackets with a corresponding semi-circular end plate on one end, while the inward radius of the bracket further supports a unibody panel consisting of semi-cylindrical individually sized compartments of varying dimensions lined with a series of hook and loop fastener material sets which secure a series of drum support strips onto the body panel into a semi-circular position. The support strips are secured inside of the body panel and within the individual drum storage compartments which are each sized to accommodate a dimensionally corresponding percussion drum in a configuration adapted to a given drum set whose quantity of drums are relative to the number of drum compartments and furthermore, drum support strips with two support strips per drum with each drum placed protectively and releasably within the drum support strips such that the plurality of drums are stored with their drum head playing surfaces facing each other and with their axis parallel. The drum support strips are comprised of a locating strip and a retaining strip which work together as a system locating and retaining the drum around its lower half dimensions. The locating strip positions and readies the drum for installment into the retaining strip after which the retaining strip holds the drum into place preventing any lateral movement.

Also incorporated into the body panel is a stationary cymbal storage rod assembly which is located towards the front of the body panel for convenience purposes. The cymbal storage rod assembly consists of a permanently attached base from which protrudes a cymbal storage rod made of low density plastic material, for example, with a series of laterally placed notches formed along the rod with an isolator pad on each side of a notch in a configuration corresponding to a given drum set whose quantity of cymbals are relative to the number of notches and furthermore, isolator pads with two isolator pads per cymbal. The cymbals are installed upon the storage rod with the individual notches protectively and releasably receiving the cymbals into their respective locations while the isolator pads assist in retaining the cymbals within the notches during movement. An optional mechanism may be attached on the opposite end of the rod to facilitate opening and closure of the assembly. A support member may be provided to offer further support for increased weight demands on the cymbal storage rod assembly.

Finally, the compartmented area of the hand truck is protected with an opening and closing but removable cover. This cover conforms to the upper and outer dimensions of the drums and spans the entire outer periphery of the body panel. The outer exposed surface of the cover usually made of heavier denier nylon material which is weather proof and protects the inner contents from the elements while the inner surface layer is made up of quilted and scratch resistant material to protect the outer surface of the drums and cymbals from scratches and damage during movement. In addition to providing protection to the drums and cymbals nested inside of the unibody panel, the protective cover also assists in retaining the drums and cymbals within their respective compartments and storage positions while further assisting in restraining the drums inside of the drum support strips during inclined movement. In addition, optional drum accessory storage compartments and bass drum pedal storage compartments can be installed to the outer surface and atop of the protective cover thru the means of an affixed substrate or side wall secured with hook and loop fasteners to the hand truck cover. The substrate or side wall is usually made of low density plastic material and acts as a type of flooring within the compartments. This configuration offers scratch and damage protection to the drum accessories and bass drum pedals, as well as the outer surface of the bass drum and cymbals being stored under the hand truck cover especially during loading, unloading, and movement of the percussion accessories and the hand truck itself. As part of the compartment there is also an attached compartment cover and end cap which comprise the permanent portions of the storage compartment assembly which also employs a temporary closure means on the opposing end. The number of accessory storage compartments typically correspond to the number of accessories of a given percussion drum set with one compartment per accessory. These and other features, objects, and benefits of the invention will be recognized by one having ordinary skill in the art and by those who practice the invention from the specification and drawing figures.

Accordingly, it is an object of the present invention to provide a hand drum truck, which makes it easier to store a percussion drum set.

These and additional objects, advantages, features and benefits of the present invention will become apparent from the following specification.

BRIEF DESCRIPTION OF THE DRAWINGS

FIG. 1B is a side sectional view of a cymbal storage rod assembly of a hand truck according to a first embodiment.

FIG. 2A is an exploded end view of a drum accessory storage compartment of a hand truck according to a first embodiment.

FIG. 3 is a top view of a hand truck with a cover attached according to a first embodiment.

DETAILED DESCRIPTION OF THE PREFERRED EMBODIMENTS

Figure 1:
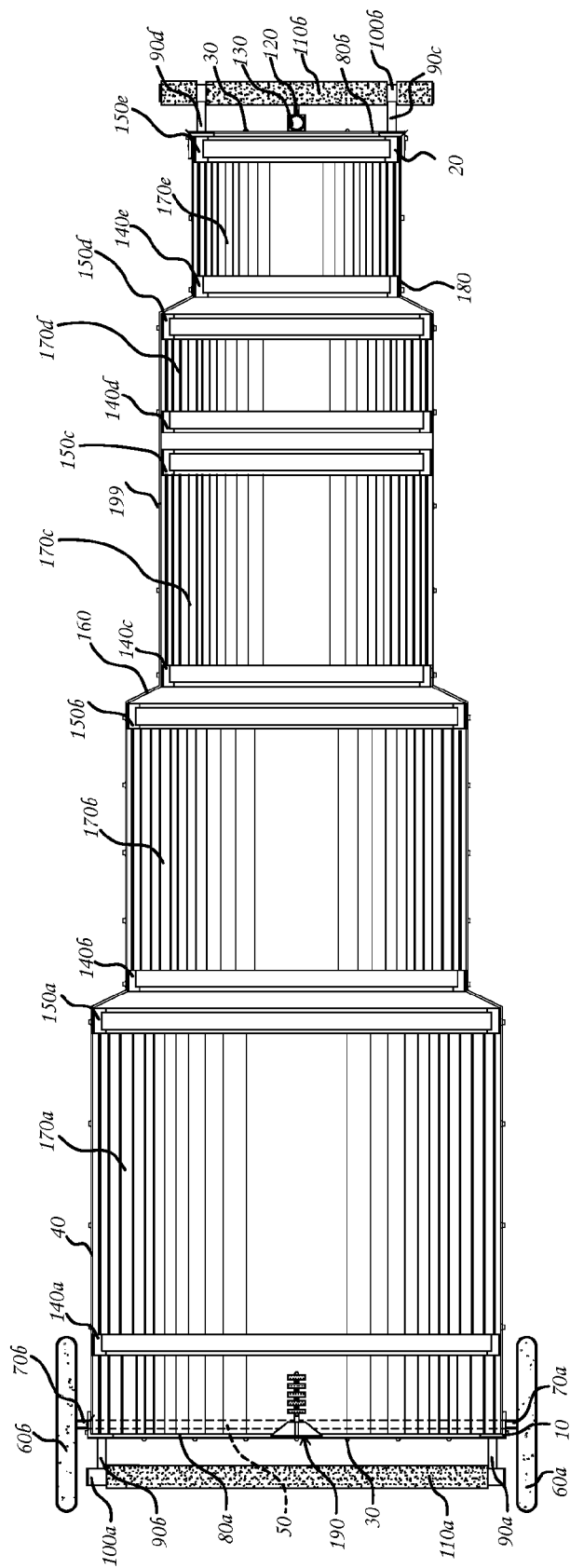
FIG. 1 is a top view of a hand truck without a cover attached according to a first embodiment.
Figure 1A:
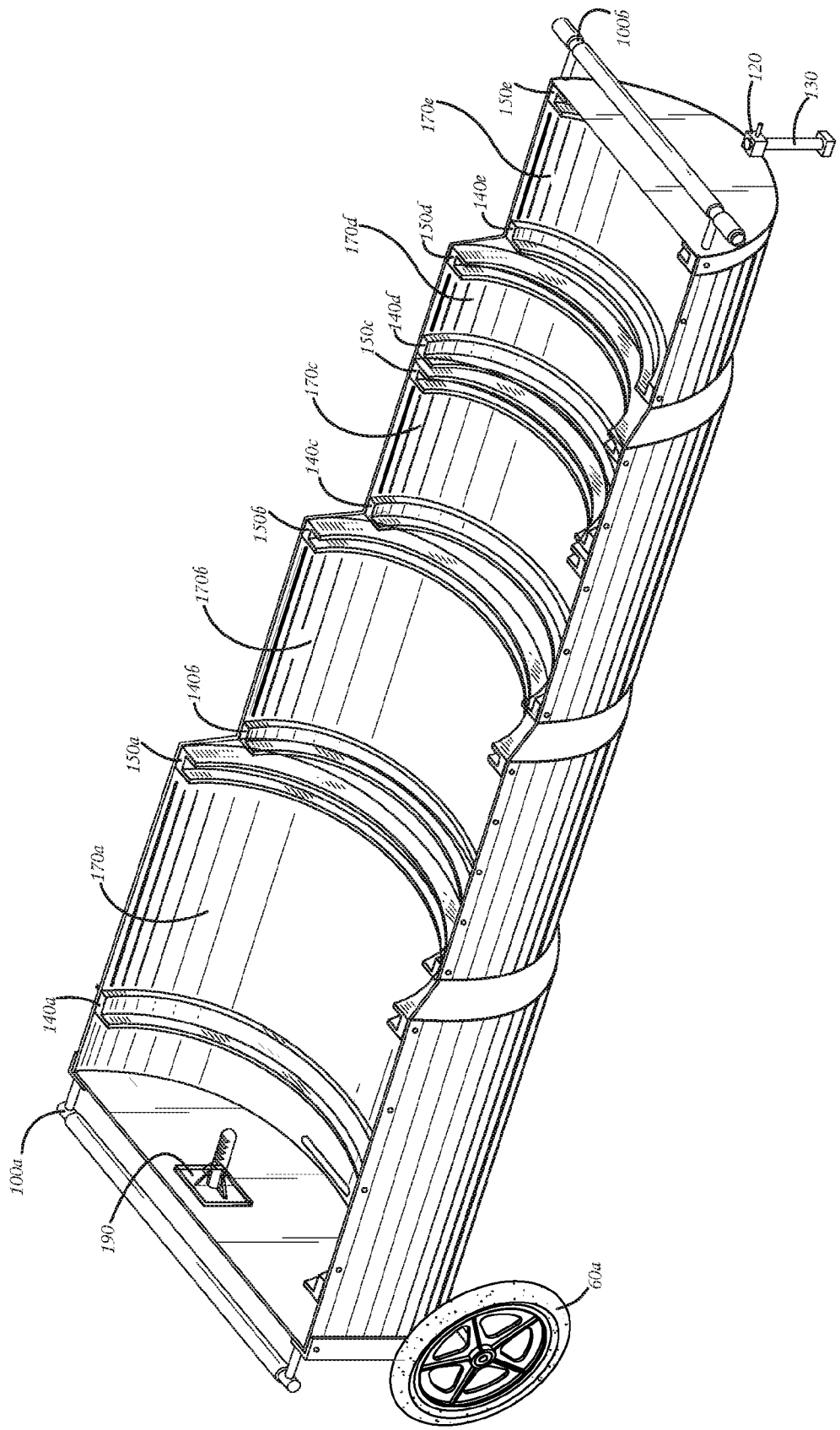
FIG. 1A is a perspective view of a hand truck without a cover according to a first embodiment.
Figure 3A:
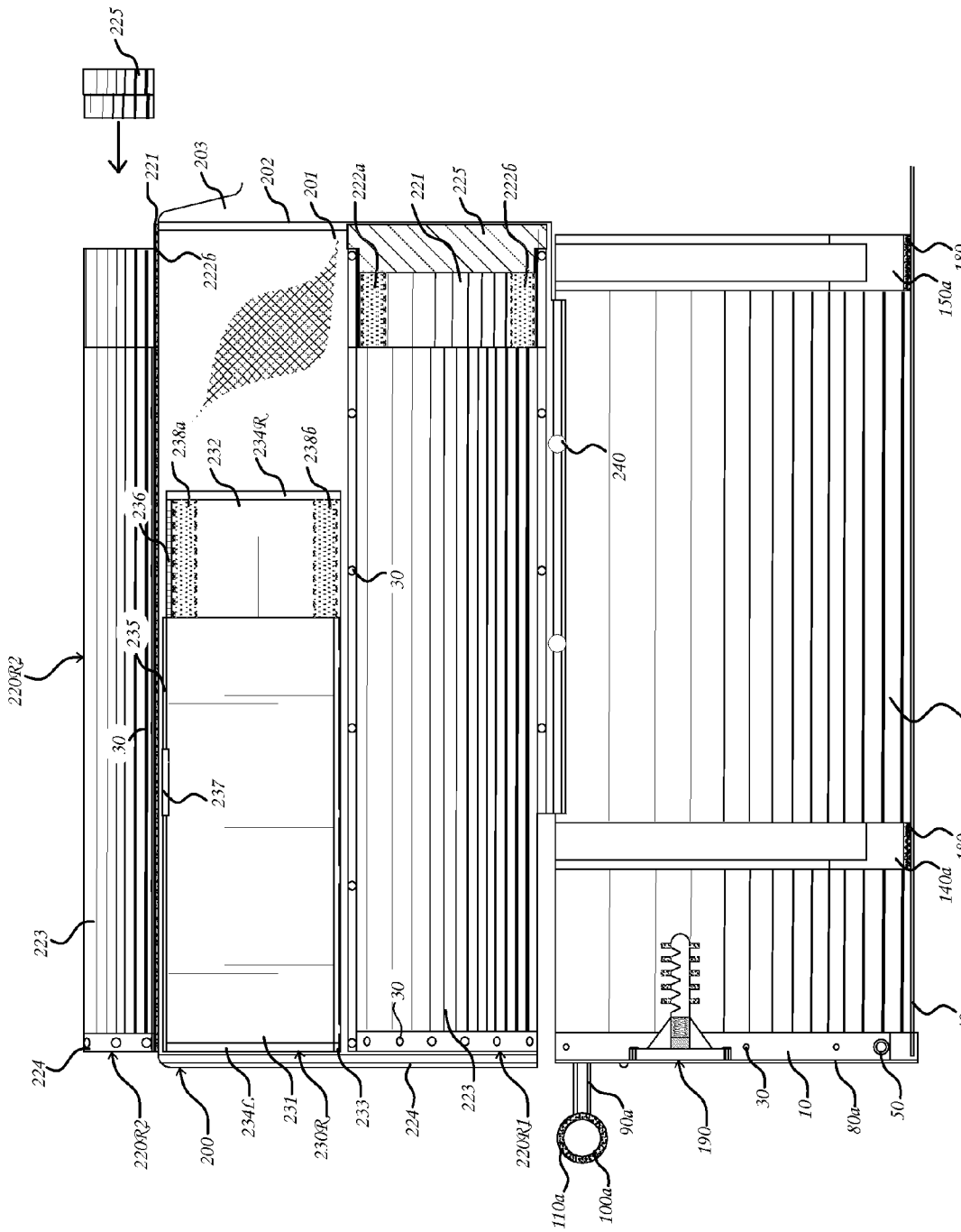
FIG. 3A is a sectional side view of a front area of a hand truck according to a first embodiment.
Figure 4:
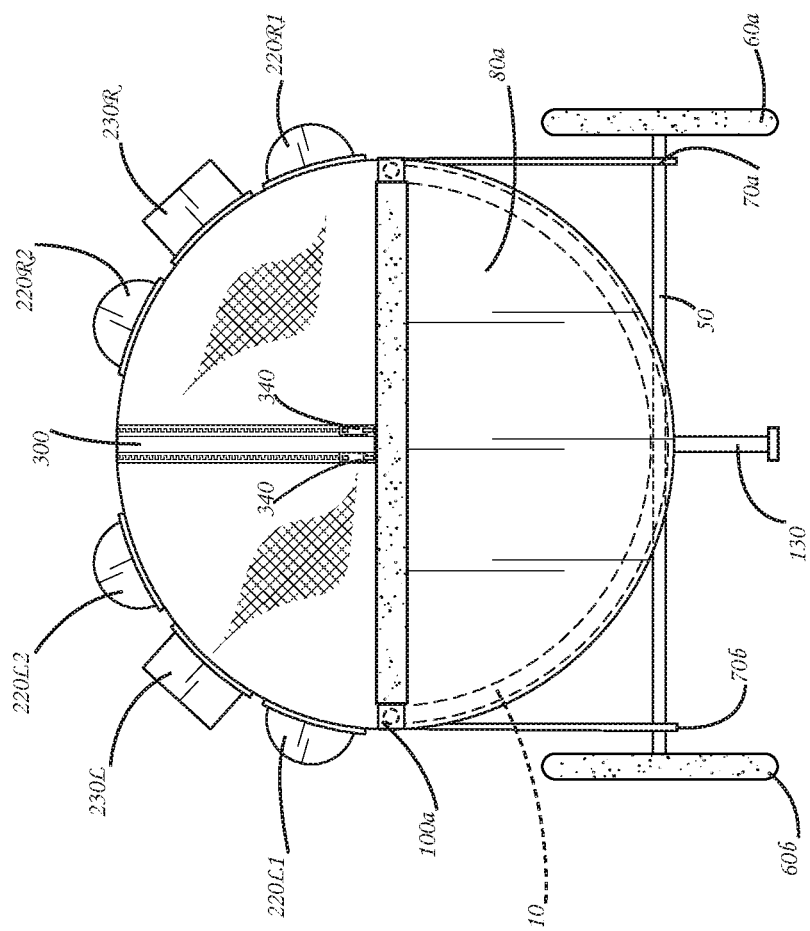
FIG. 4 is a front end view of a hand truck according to a first embodiment.
Figure 5:
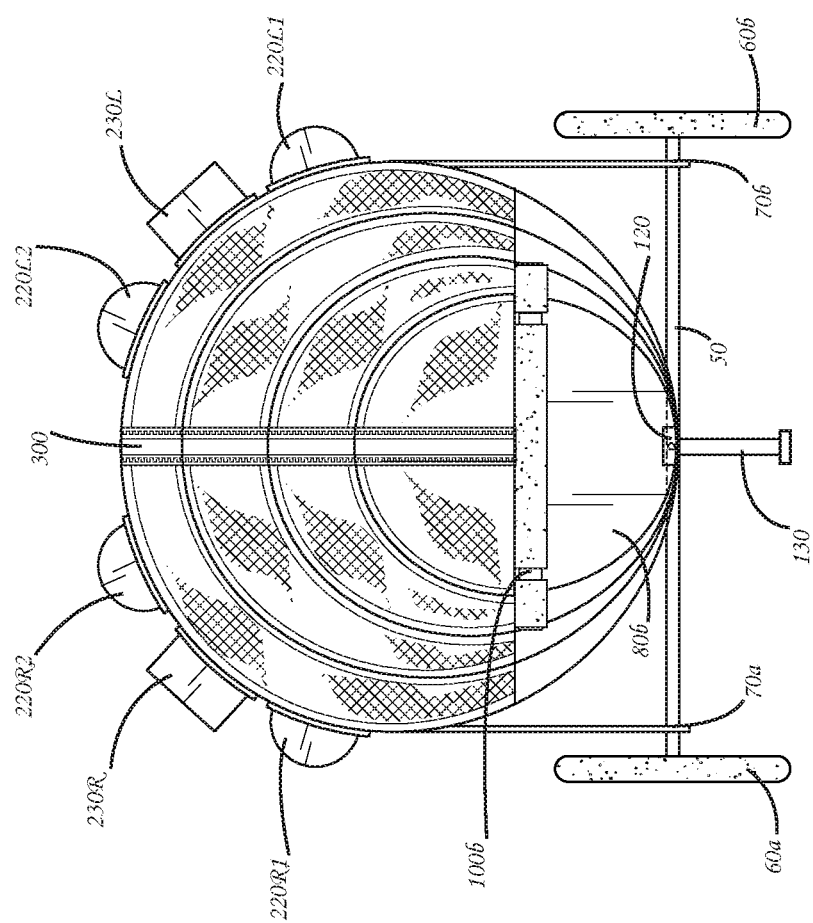
FIG. 5 is a rear end view of a hand truck according to a first embodiment.
Figure 6:
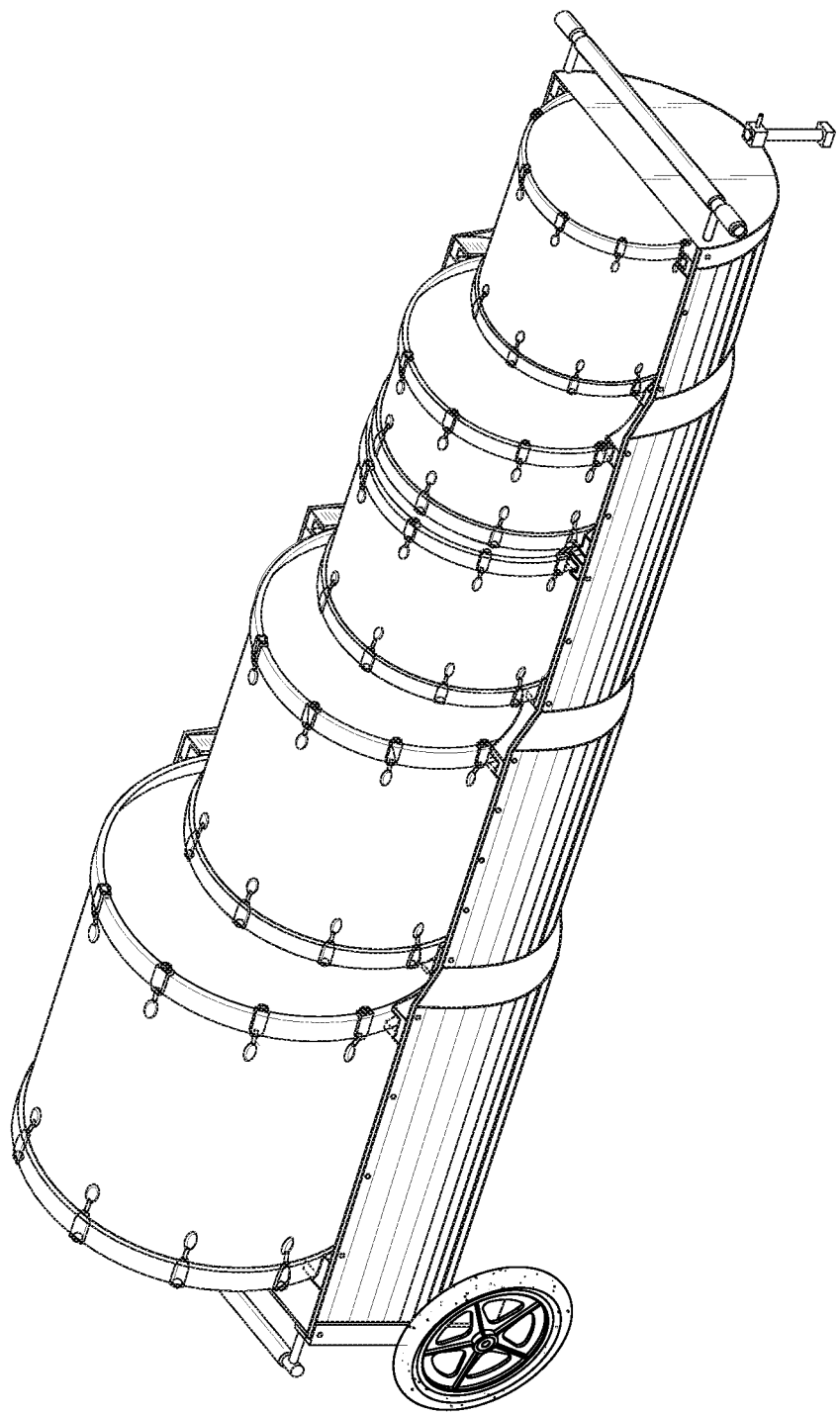
FIG. 6 is a perspective view of a hand truck without a cover attached, loaded with percussion drums.

Referring now more particularly to the accompanying drawings, and in the first instance to FIGS. 1, 1A, and 3A, as well as FIGS. 4 and 5 representing the first embodiment where illustrated are two pieces of 90° L-shaped aluminum material bent or formed into a arcuate shapes that comprises the front and rear adjoining brackets 10 and 20 respectively, which act as the primary support members for the hand truck. The brackets are formed into a semi-circular shape and have a curved or radiused bottom extending lower between the upper ends with a series of holes along the side facing outer periphery which are sized to accept rivets 30 for attachment of the body panel 40. The front bracket 10 has two larger diameter holes one on each side surface centered and positioned to the appropriate height on the bracket which will allow a piece of aluminum tubing to be installed and permanently secured which will function as the axle 50 onto which pneumatic wheels 60a and 60b are mounted. Two similar pieces of aluminum tubing are perpendicularly and permanently attached between the adjoining bracket 10 and axle 50 as struts 70a and 70b which provides reinforcement and rigidity to the axle.

At the front and rear ends of the hand truck are identical pieces of plastic material such as polyethylene, for example, which comprise the front and rear end plates 80a and 80b which act as end closures for the hand truck. These plastic material pieces are cut or machined to conform in size and shape to the outer most front and side facing periphery of the adjoining brackets 10 and 20. The front and rear end plates 80a and 80b have a holes on each side of the front or rear facing ends which line up to allow for attachment of the front and rear handle mounts 90a, thru 90d to be permanently installed into the upper ends of the adjoining brackets 10 and 20 onto which the front and rear handles 100a and 100b are installed and permanently attached as well as handle grips 110a and 110b. A last outward component located the rear of the hand truck is a leveling device that incorporates a spring actuated locking mechanism 120 further supported by a tubular support member 130. The leveling device holds the hand truck in a level horizontal position during the load or unload cycle. The support member 130 is adjustable and actuates upward to a transport movement position or downward into a load or unload position with the locking mechanism securing the support member 130 at its appropriate pre-determined height.

Now referring to the inner components (FIGS. 1, 1A, 1B, and 3A) according to the first embodiment one will notice, as previously mentioned, a body panel 40 constructed typically from a thin sheet of low density plastic material usually identical in material composition to the other plastic components within the hand truck. The plastic sheet is machined or otherwise formed initially to conform to the outward dimensions of a predetermined drum locating and retaining drum support strips 140a thru 140e and 150a thru 150e respectively, by making one trim angle cut on each side of the sheet towards the inward length centerline of the material with each trim angle cut being of equal angle and length. These types of fabrication trim angle cuts are performed respectively for each individual drum compartment(s) and will later become a series of chamfers 160. The trim cut angle is equal to a dimensional reduction relevant to the outer dimensions of a predetermined drum locating and retaining support strip that corresponds inwardly to the diameter of a predetermined percussion drum of the hand truck owner. The polyethylene sheet is then heated and formed into a series semi-cylindrical shapes where the final body profile will become evident consisting of individually sized drum compartments 170a thru 170e of varying dimensional diameter from larger to smaller formed in a stepped-like pattern. This stepped-like pattern is facilitated by the angles or chamfers 160, as previously mentioned, that enable a conversion of inside dimensions of the compartments from one predetermined size to the next usually from larger to smaller. One should note that in some instances there may two percussion drums of the same dimensional diameter as shown in drum compartments 170C and 170D, Thus, would require a configuration of two identically sized drum compartments of a predetermined dimensional diameter for two given predetermined percussion drums of proportional diameter. Therefore, a conversion of inside dimensions of the compartments from one predetermined size to the next from larger to smaller is not necessary for these types of drum storage compartments. The body panel 40 as well as the front and rear facing end plates 80a and 80b are attached by rivets 30 to the front and rear adjoining brackets 10 and 20 which forms the body panel assembly with all of the outward features now visible. Within each of drum the compartments 170a thru 170e are a series of drum locating and retaining support strips 140a thru 140e and 150a thru 150e respectively, placed into drum storage compartments 170a thru 170e while being attached with hook and loop fastening strips 180 within the body panel 40 to form their respective semi-circular shape. The drum support strips are provided as a set which consist of a locating strip 140a thru 140e and a retaining strip 150a thru 150e. These locating drum support strips 140a thru 140e are fashioned from L-shaped rubber or foam material, while a second member, referred to as retaining drum support strips 150a thru 150e are constructed of a grooved shaped rubber or foam material. Both types of drum support strips are measured and cut to a desired length and should conform dimensionally and circumferentially to the inner surface of each drum storage compartment 170a thru 170e of varying dimensional diameter within the body panel. After which, the hook and loop fastening strips 180 are selected for cutting. Once selected, Both portions of the hook and loop strips already joined together as a set from the manufacturer by their affective fastening surface types are measured and cut to conform to the inner dimensional diameter of each drum storage compartment 170a thru 170e of varying dimensional diameters within the body panel, as well as the outer mating surface dimensions of the drum locating and retaining support strips 140a thru 140e and 150a thru 150e respectively. The set of hook and loop fastening strips are unjoined into separate strips exposing their individual effective fastening type surfaces. One fastening surface type from the hook and loop fastening set is adhesively exposed on the opposite side of its effective fastening type surface then positionally pressed onto, and secured by its adhesive fastening surface to what should be considered as the underside of either a locating or retaining support strip 140a thru 140e or 150a thru 150e. Once completed, The remaining and opposing fastening type surface of the hook and loop strip 180 is adhesively exposed on the opposite side of its fastening surface. Now the entire drum locating or retaining support strip assembly is positioned over the inner surface of a particular drum storage compartment 170a thru 170e approximate to its appropriate attachment location then lowered and pressed into position. Each adhesive surface of the hook and loop fastening strip should contact with the opposing plastic material surface joining and securing the locating or retaining drum support strip 140a thru 140e or 150a thru 150b to the inner surface of the drum storage compartment 170a thru 170e into place at a correct position next to a corresponding chamfer 160 relevant to that particular drum storage compartment. As previously mentioned, One should note that in some instances it may be required to store or transport two percussion drums of the same dimensional diameter as shown in drum compartments 170C and 170D. As there are two given predetermined percussion drums for one drum storage compartment one locating drum support strip 140C and one drum retaining support strip 150C are placed in a position which corresponds to the outermost diameter and length dimensions of each percussion drum to be stored and transported in drum compartments 170C and 170D. Furthermore, The inner curvature of each drum locating and retaining strips 140a thru 140e and 150a thru 150e is intended to conform to the outer dimensions of a preselected percussion drum to be loaded, supported, and transported such that the plurality of drums are stored with their drum head playing surfaces facing each other and with their axis parallel.

Another component located inside of the hand truck is the cymbal storage rod assembly 190 (FIGS. 1, 1A, 1B and 3A) which consists of a mounting base 191, a cymbal storage rod receiver 192, triangular shaped reinforcements 193a and 193b, a cymbal storage rod 194, and isolator pads 195. The mounting base 192 is permanently attached to the inner surface of the front end panel 80a using rivets 30 or similar fasteners and has a series of triangular shaped reinforcements 193a and 193b circularly and permanently attached between the mounting base 191 and the outer radiused surface of the cymbal storage rod receiver 192. The storage rod receiver 192 consists of a cylinder centered and Permanently secured between the triangular shaped reinforcements 193a and 193b having inwardly located threads 196 which allows rotational insertion of the cymbal storage rod 194. The cymbal storage rod 194 protrudes from the storage rod receiver 192 and is made preferably of a low density polyethylene material which has outward threads on one for rotational insertion into the storage rod receiver 192. Also incorporated into the cymbal storage rod 194 are a series of V-shaped notches 197 spaced laterally along the storage rod itself which allow for the placement of percussion cymbals. Additionally along the storage rod are a series of isolator pads 195, previously mentioned, which consist of a dense felt or cloth material and are located between the notches 197. These isolator pads assist in maintaining the position of the cymbals within the notches while contributing to the protection and stability of the cymbals during movement.

Figure 2:
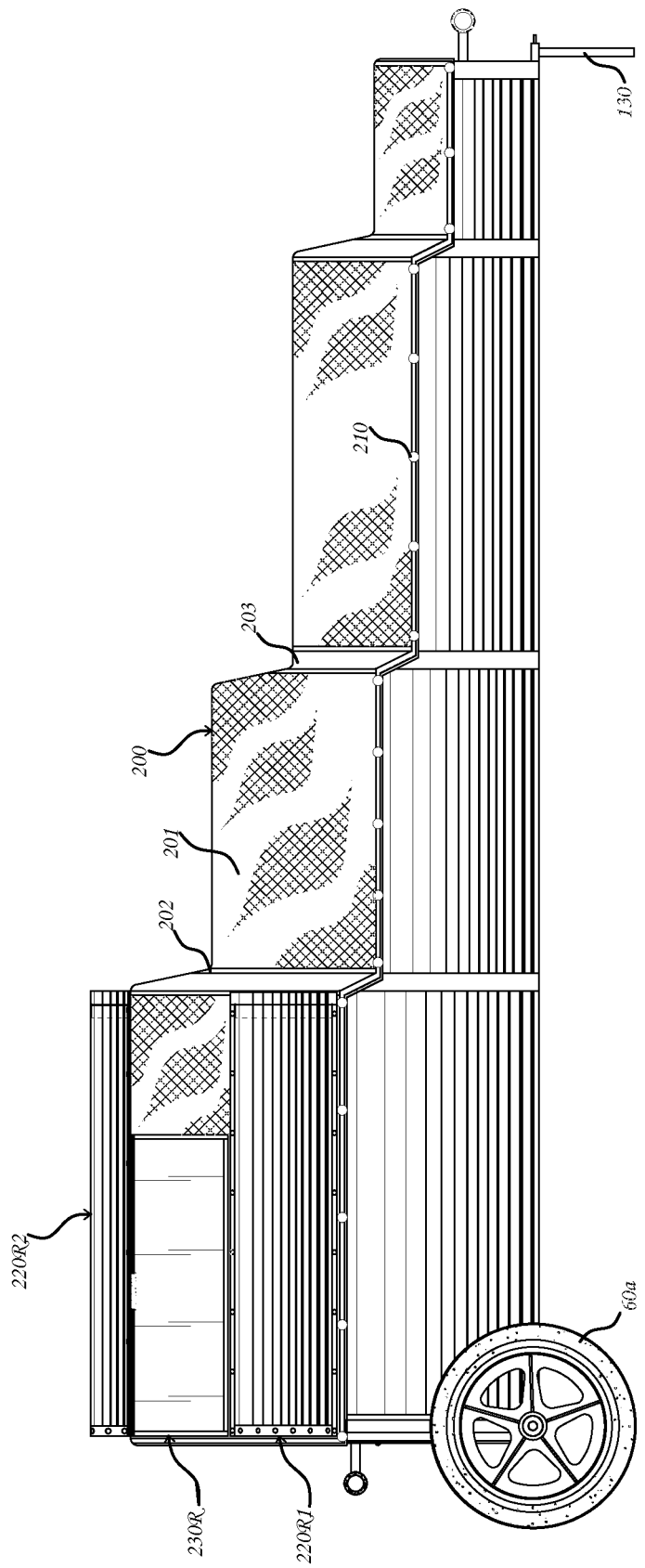
FIG. 2 is a side view of a hand truck with a cover attached according to a first embodiment.

Directing ones attention now to FIGS. 2, 3, and 3A as well as FIGS. 4 and 5 where observed is a hand truck cover 200. The hand truck cover typically consists of a heavier denier nylon or canvas material measured and cut to conform dimensionally to the outer perimeter of the front and rear support brackets 10 and 20, body panel 40, as well as the front end rear end plates 80a and 80b. The cover should also conform along its upper surface to the varying outward dimensions of a given plurality of percussion drums. A predetermined cover section 201 is placed into a joining position along with a next cover section to be assembled then permanently joined by stitching 202 the cover sections together thru the use of the chamfer cover sections 203. These chamfer cover sections are somewhat wedge shaped having one shorter edge than the other to form a type of triangle with an inward facing trim angle cut on each end. These chamfer cover sections 203 enable a conversion of size dimensions within the hand truck cover relative to the drum storage compartments 170a thru 170e from one predetermined size to the next usually from larger to smaller. Each cover section 201 protectively covers a drum storage compartment within the body panel 40 in addition to the loaded cymbal storage rod assembly 190. The outermost dimensions of the cover are removably fastened to the outer periphery of the front and rear support brackets 10 and 20, the body panel 40, as well as the front and rear end plates 80a and 80b thru the use of inner and outer snap fasteners 199 (FIG. 1) and 210 (FIG. 2).

Additionally, the hand truck cover 200 supports an array of storage compartments FIGS. 2, 2A, 3, and 3A, as well as FIGS. 4 and 5 which are referred to as drum accessory storage compartments 220R1, 220R2, 220L1 and 220L2 and bass drum pedal storage compartments 230R and 230L respectively. These identical drum accessory storage compartments 220R1 thru 220L2 are rectangular in shape along the bottom while being semi-cylindrical along the upper surface. There is an aperture portion on one end sized to accept a preselected drum accessory to be stored with the drum accessory releasably nested inside each of the drum accessory storage compartments.

Now referring more particularly to FIG-2A where depicted in greater detail are the drum accessory storage compartment components. A substrate floor 221 with attached hook and loop fastening surface types 222a and 222b, an accessory storage compartment cover 223, and end closure 224 on the front facing end. On the rearward facing end of the storage compartment is a releasably removable plug 225 which provides a temporary means of closure for loading and unloading of drum accessories. In constructing the accessory storage compartment a first square piece of low density plastic material such as polyethylene, for example, is cut or machined into its respective shape to form the substrate floor 221. A slight curvature is formed into the substrate floor 221 which allows the outward curvature and underside portion of the substrate floor 221 to conform dimensionally and circumferentially to the outer curvature of the hand truck cover as well as the percussion drums positioned and stored underneath the hand truck cover. Afterwards, a second piece of polyethylene material is cut or machined to form a storage compartment cover. Continually, a series of holes are drilled or machined along the right and left edges of the material to allow attachment to the substrate floor 221 then, a 90° angle is bent or formed along the right and left edges of the material located parallel and horizontally along the rivet holes to create a mating surface for attachment to the substrate floor 221 thru the use of rivets 30. The entire second polypropylene piece is then formed or bent into a semi-cylindrical shape to form the storage compartment cover 223. The third component of the accessory storage compartment assembly is an end closure in the shape of a semi-circular plate 224 that consists of a small piece of identical polypropylene material which is cut or machined to conform to the inner dimensions of the accessory storage compartment cover 223 and substrate floor 221 with a series of rivet holes drilled along a 180° radiused semi-circular curvature on one side while having a straight line edge on the other side with the material being sized in width to accept rivets 30. A final component of the drum accessory storage compartments 220 are the hook and loop fastening surface type strips 222a and 222b which attach the drum accessory storage compartments 230R1 thru 230L2 to the hand truck cover 200. Both portions of the hook and loop strips which are already joined together as a set from the manufacturer by their affective fastening surface types, are measured and cut to conform dimensionally lengthwise to the outer surface of each substrate floor 221 of a drum accessory storage compartment as well as the hand truck cover.

The set of hook and loop fastening strips are unjoined into separate strips exposing their individual effective fastening type surfaces. One fastening surface type 222a and 222b from the hook and loop fastening strip set is adhesively exposed on the opposite side of its effective fastening surface and pressed onto what should be considered the underside of the substrate floor 221 into a position by use of its adhesive fastening surface relative to being joined with the opposing hook and loop fastening surface type attached to outer surface of the hand truck cover 200 into a location by use of its adhesive fastening surface relative to being joined with the opposing hook and loop fastening surface type attached to the underside of the substrate floor 221. This hook and loop fastening surface type strip is then permanently attached to its current location with stitching 202 to prevent detachment from the hand truck cover 200 during optional removal of the drum accessory storage compartments 230R1 thru 230L2. Lastly, all three components 221, 223, and 224 are then positioned for assembly and riveted together to comprise the permanently attached components of the accessory storage compartment. A temporary closure plug 225 is inserted into place completing the entire drum accessory storage compartment.

In further and closer examining FIGS. 2 thru 5 are one of two bass drum pedal storage compartments 230R and 230L that are sandwiched between the drum accessory storage compartments 220R1 and 220R2 with 220L1 and 220L2 not shown. The identical bass drum pedal storage compartments are somewhat square in shape having an aperture portion with attached lid on the upper area sized to accept a bass drum pedal to be stored with the bass drum pedal releasably nested inside of the storage compartment.

Now referring more particularly to FIG-2A, noticed is a sectional cut-away view of identical bass drum pedal storage compartments 230R and 230L. In constructing the bass drum pedal storage compartment a first rectangular piece of low density plastic material, as with the other plastic components, using polyethylene for example, is cut or machined into its respective shape to form the outer side wall 231 along with an identical second square piece as the inner side wall 232. A 90° angle is formed toward the bottom area of the single piece of material which will comprise a rectangular shaped portion as the compartment floor 233 as well as a remaining square shaped portion as the outer side wall 231. The second piece of material is cut or machined to form its respective shape as the inner side wall 232. A slight curvature is formed into the inner side wall 232 which allows the outward curvature and underside portion of the inner side wall 232 to conform dimensionally and circumferentially to the outer curvature of the hand truck cover as well as the percussion drums positioned and stored underneath the hand truck cover. Afterwards, three additional pieces of polyethylene material are cut or machined to respective shapes as the compartment end walls 234R and 234L, and the compartment lid 235. A slight curvature is also cut or machined along the inward facing edge of both end walls 234R and 234L to correspond dimensionally and circumferentially with the curvature of the inner side wall 232. The outer side wall 231 and compartment floor 233, as a single 90° component are joined to the end walls 234R and 234L as well as the inner side wall 232 thru the use of an effective heat fusing technique. Lastly, by use of a heat fusing technique, the latching mechanism 237 is mounted upon the lid 235 which are attached to the hinge 236 then permanently attached to the inner side wall 232. A last component of the bass drum pedal storage compartments are the hook and loop fastening surface type strips 238a and 238b which attach the bass drum pedal storage compartments 230R and 230L to the had truck cover. Both portions of the hook and loop strips which are already joined together as a set from the manufacturer by their affective fastening surface types, are measured and cut to conform dimensionally lengthwise to the outer surface of each inner side wall 232 of a bass drum pedal storage compartment. The set of hook and loop fastening strips are unjoined into separate strips exposing their individual effective fastening type surfaces. One fastening surface type 238a and 238b from the hook and loop fastening set is adhesively exposed on the opposite side of its effective fastening surface and pressed onto what should be considered the underside of the inner side wall 232 into a position by use of its adhesive fastening surface relative to being joined with the opposing hook and loop fastening surface type attached to outer surface of the hand truck cover 200 into a location by use of its adhesive fastening surface relative to being joined with the opposing hook and loop fastening surface type attached to the underside of the inner side wall 231. This hook and loop fastening surface type strip is then permanently attached to its current location with stitching 202 to prevent detachment from the hand truck cover 200 during optional removal of the bass drum pedal storage compartments 230R and 230L. This opposing hook and loop fastening type strip is then permanently attached to the hand truck cover 200 with stitching 202 to prevent detachment from the hand truck cover during optional removal of the bass drum pedal storage compartments 230R and 230L. The completed and attached drum accessory storage compartments 220R1 thru 220L2 and bass drum pedal storage compartments 230R and 230L are now ready for attachment to the hand truck cover 200.

Conclusively, one will notice in reference to FIGS. 2, 3, 3A, 4, and 5 the completed and attached drum accessory storage compartments 220R1 thru 220L2 and bass drum pedal storage compartments 230R and 230L. Starting with drum accessory storage compartments 220R1 thru 220L2, each compartment is then positioned over the outer surface of the hand truck cover 200 approximate to its appropriate attachment location then lowered and pressed into position with each hook and loop fastening type surface 222a and 222b contacting with the opposing hook and loop fastening surface type joining together as a pair while optionally securing the storage compartments 220R1 thru 220L2 to the hand truck cover by use of the effective fastening surfaces of the hook and loop fastening strips 222a and 222b. These storage compartments 220R1 thru 220L2 are arranged and attached in a horizontal configuration with their axes parallel with the hand truck itself. Next to be attached to the hand truck cover 200 are the bass drum pedal storage compartments 230R and 230L. Starting with a bass drum pedal compartment 230R or 230L, each compartment is then positioned over the outer surface of the hand truck cover 200 approximate to its appropriate attachment location then lowered and pressed into position with each hook and loop fastening type surface contacting with the opposing hook and loop fastening surface type joining together as a pair while optionally securing the bass drum pedal storage compartments 230R and 230L to the hand truck cover 200 by use of the effective fastening surfaces of the hook and loop fastening strips 238a and 238b. The drum accessory storage compartments 230R2 and 230L2 are supported primarily by resting upon the bass drum while attached to the cover 200 thru the use of the hook and loop fasteners 222a, 222b, 238a and 238b while resting upon the bass drum nested under the bass drum cover 200. The bass drum pedal storage compartments 230R and 230L are supported by attachment to the hand truck cover 200 thru the use of hook and loop fastening strips 238a and 238b while resting against the bass drum and are further supported by drum accessory storage compartments 220R1 and 220L1 while resting against the bass drum. Drum accessory storage compartments 230R1 and 230L1 are supported primarily by attachment to the hand truck cover 200 thru the use of hook and loop fastening strips 222a, 222b while resting against the bass drum and are further supported by the upper edge of the body panel 40.

Finally, in closer observation of FIG. 3 one last component of the hand truck cover 200 is a double zipper type closure 300 with included zipper handle 340 to facilitate the opening and closure of the cover 200 in preparation for either loading or unloading. The double zipper type closure 300 is permanently attached to the cover thru the use of stitching 202 into a central location on the hand truck cover 200, which spans the entire length dimension of the hand truck. The cover, while closed, also aids in the retention of the percussion drums within the drum locating and retaining support strips 140a thru 140e and 150a thru 150e and especially while the hand truck is in a somewhat inclined movement position. Attached to the top of the hand truck cover 200 and perpendicular to the zipper type closure 300 are the tension resistance levers 310a and 310b, the retaining posts 320a and 320b, as well as the locking posts 330a and 330b. The tension resistance levers 310a and 310b are comprised of a low density plastic material, similar to the other plastic components. Each locking lever is cut or machined into its respective shape which is somewhat key shaped and has a larger portion on one end that incorporates an orifice which allows rotation around retaining posts 320a and 320b, while the other end has an inside radiused cut-out portion which accepts engagement with the outer circumference area of the locking posts 330a and 330b. These tension resistance levers are also somewhat curved to conform to the outer surface of the hand truck cover 200 as well the bass drum stored underneath. The posts are typically made of a lightweight corrosion resistant metal such as aluminum for example. There is flanged portion located at the top of the retaining posts 320a and 320b to prevent detachment of the tension resistance levers 310a and 310b from the retaining posts 320a and 320b while permanently secured as well as the locking posts 330a and 330b to prevent dis-engagement of the locking levers 310a and 310b from the locking posts 330a and 330b while temporarily secured during transport. In the final step, the orifice end of the tension resistance levers 310a and 310b are positioned over the outer surface of the hand truck cover 200 approximate to their appropriate attachment location then lowered into an assembly position over a mounting orifice which is fabricated at a predetermined location into the hand truck cover 200 relative to the anticipated location of the locking posts 330a and 330b. The retaining posts 320a and 320b are inserted into a mounting orifice located on the large end of the tension resistance levers 320a and 320b then pressed further downward into the mounting orifice of the hand truck cover 200 where it permanently attached in similar fashion as a rivet type fastener.

OPERATION

The manner of using the hand truck for percussion drums and related accessories is not identical to that of prior hand trucks or current hand truck designs in present use. Namely, the user of the hand truck and typically the percussionist of the drum set first grasps the rear handle 100b (FIGS. 1, 1A, 2, and 3) as well as (FIGS. 4 and 5) then propels the hand truck through the use of wheels 60a and 60b in a somewhat inclined vertical position to a predetermined loading area in the near vicinity of a percussion drum set which may be arranged in a playing configuration according to the drummer or user of the hand truck. Next the hand truck is positioned horizontally resting upon the leveling device support member 130 (FIGS. 1, 1A, and 2) as well as (FIGS. 4, and 5). Then one disengages the tension resistance levers 310a and 310b (FIG. 3) then grasps the zipper handle 340 (FIG. 4) and slides the zipper handle towards the rear of the hand truck in an opening fashion to expose the drum storage compartments and cymbal storage rod assembly within the hand truck.

Now one readies the cymbal storage rod 190 (FIGS. 1, 1A, 1B, and 3A) by disengaging the optional closing mechanism and removing the isolator pads 195 (FIG. 1B) then begins to place the cymbals on the cymbal storage rod 194 with the preferred method being from large to small. Starting usually with the largest cymbal from a configured percussion drum set, the cymbals one after another, are placed onto the storage rod and into the notches moving to and fro loading the cymbals until all of the cymbals from the drum set are in positioned into place upon the storage rod 194 and within the notches 197. One then closes the optional locking mechanism located at the end of storage rod 194 and progresses to the next task. In the next step, one grasps the bass drum from the drum set and then inserts the bass drum into the dimensionally correct compartment within the hand truck placing the bass drum onto and into the drum support strips starting with the locating support strip 140a then inserting the bass drum into the retaining support strip 150a securing the drum around the lower half independently. The user of the hand truck will continue in this fashion moving to and fro loading and inserting the drums one after another directly from the configured drum set into the predetermined and dimensionally correct compartments of the hand truck resting the drums into the locating drum support strips 140b thru 140e and retaining support strips 150b thru 150e until all of the drums from the drum set are loaded.

Succeedingly, one will have the intention of closing the hand truck cover 200 (FIG. 2) and (FIG. 3) and will grasp the zipper handle 340. FIG. 4 and sliding the handle towards the front of the hand truck until the double zipper type closure 300 on cover 200 is completely closed then engages the tension resistance levers 310a and 310b to prevent damage to the double zipper type closure 300 and cover 200.

Figure 2B:
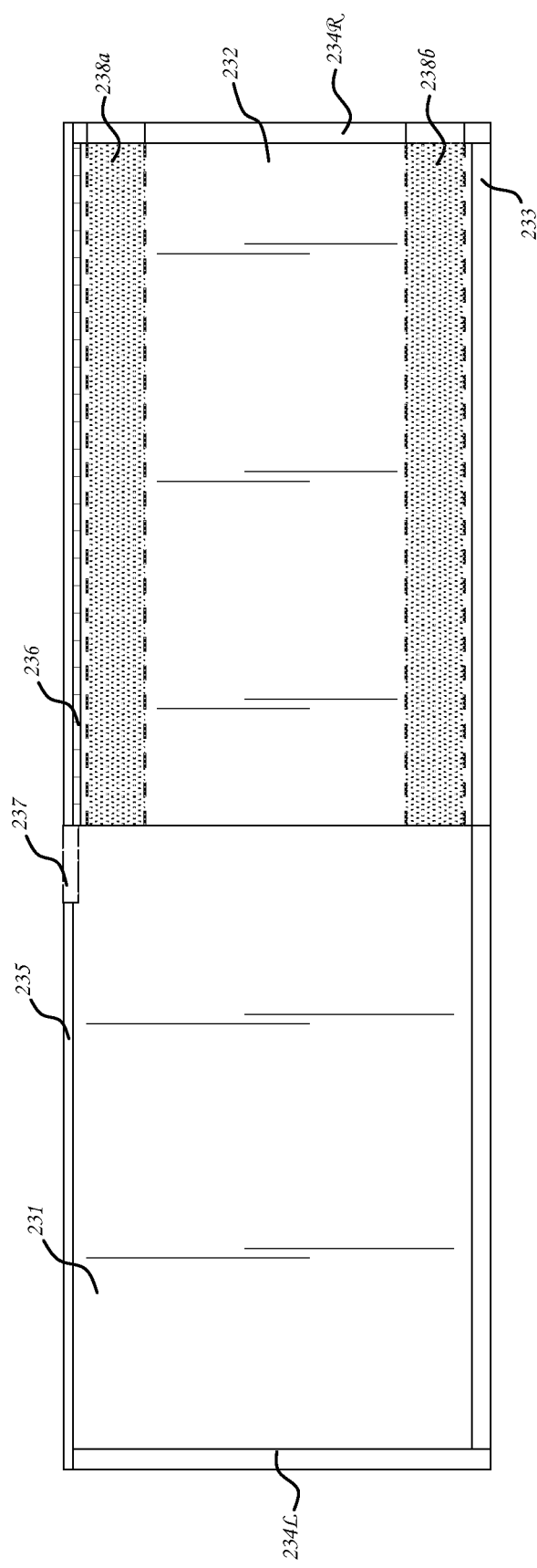
FIG. 2B is a sectional side view of a bass drum pedal storage compartment of hand truck according to a first embodiment.

Finally, one using the hand truck will obtain an accessory hardware piece directly from the configured drum set having the intention of inserting each drum accessory into its predetermined and correct accessory storage compartment 220R1 thru 220L2. Each piece of cymbal related hardware is dis-assembled, folded, and collapsed downward into its smallest configuration then inserted into each of the accessory storage compartments 220R1 thru 220L2 then the closure plugs 225 (FIGS. 2, 2A, 3, and 3A) are temporarily installed. Next, one using the hand truck will obtain a bass drum pedal directly from the configured drum set having the intention of inserting each bass drum pedal into its predetermined and correct bass drum pedal storage compartment 230R thru 230L. The bass drum pedals are dis-assembled, folded, and collapsed downward into their smallest configuration then placed into the bass drum pedal storage compartments 230R thru 230L then the latch closure 237 (FIGS. 2B and 3A) is engaged.

When ready, the loaded hand truck can be propelled to some type of awaiting motor vehicle parked out of doors while in the event of an incline or stairs located within the path of transport the front handle 100a (FIGS. 1, 1A, 3A, and 4) can be used by a second individual to assist during adverse transport cycles such as moving the hand truck up and down a flight of stairs or an incline. Unloading is the reverse of loading.

It will be understood by one having ordinary skill in the art and by those who practice the invention that various modifications and improvements may be made without departing from the spirit of the disclosed concept. Various terms including left, right, front, back, top, and bottom, for example, are used in the detailed description of the invention and the claims only to convey relative positioning of various elements of the claimed invention.

ALTERNATE EMBODIMENTS

There are other possibilities and configurations regarding the various materials and components that comprise the invention. In constructing the body panel 40 (FIG. 1) the first embodiment employs a low density plastic such as polyethylene however other composite materials may be used having acceptable results. Materials such as fiberglass resin or carbon fiber may be substituted for or used in replacement of low density plastic. The fiberglass or carbon fiber materials can be built up in layers and bonded with a type of resin, then shaped with hand tools to form its respective shape. A type of resin or molded plastic may also be used to construct the body panel 40 by liquefying the plastic or resin at a certain temperature then pouring the liquefied material into a mold to form its respective shape.

Figure 7:
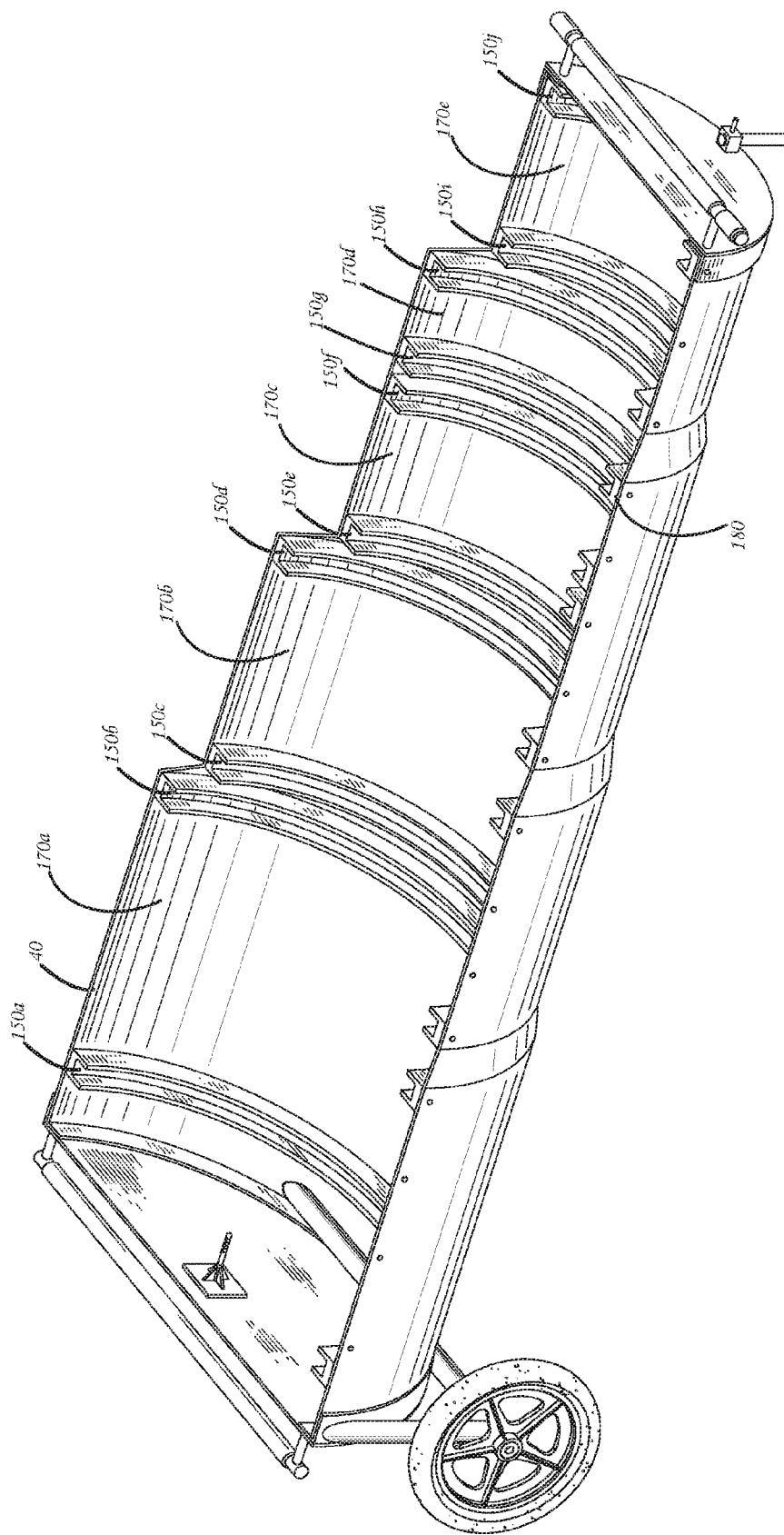
FIG. 7 is a perspective view of a hand truck illustrating a plurality of retaining drum support strips according to an alternate embodiment.

One will notice in (FIG. 7) a plurality of semi-cylindrical drum compartments of verifying dimensions. Within each of the drum compartments 170a thru 170e as an alternative method of drum control and storage, a series of drum retaining support strips 150a thru 150j respectively, are affixed to the inside surface of the body panel 40 thru the use of hook and loop fastening strips 180. These retaining drum support strips 150a thru 150j are constructed of a grooved shaped rubber or foam material and are placed into drum storage compartments 170a thru 170e while being attached with hook and loop fastening strips 180 within the body panel 40 to form their respective semi-circular shape. The retaining drum support strips 150a thru 150j are measured and cut to a desired length and should conform dimensionally and circumferentially to the inner surface of each drum storage compartment 170a thru 170e of varying dimensional diameters within the body panel.

One who is typically a drummer and user of the hand truck grasps the bass drum from a configured drum set and then inserts the bass drum into the dimensionally correct storage compartment 170a within the hand truck placing the bass drum onto and into the drum retaining support strips 150a thru 150j securing the drum around the lower half independently. The user of the hand truck will continue in this fashion moving to and fro loading and inserting the drums one after another directly from the configured drum set into the predetermined and dimensionally correct compartments of the hand truck resting the drums into the retaining drum support strips 150a thru 150j until all of the drums from the drum set are loaded.

Figure 8:
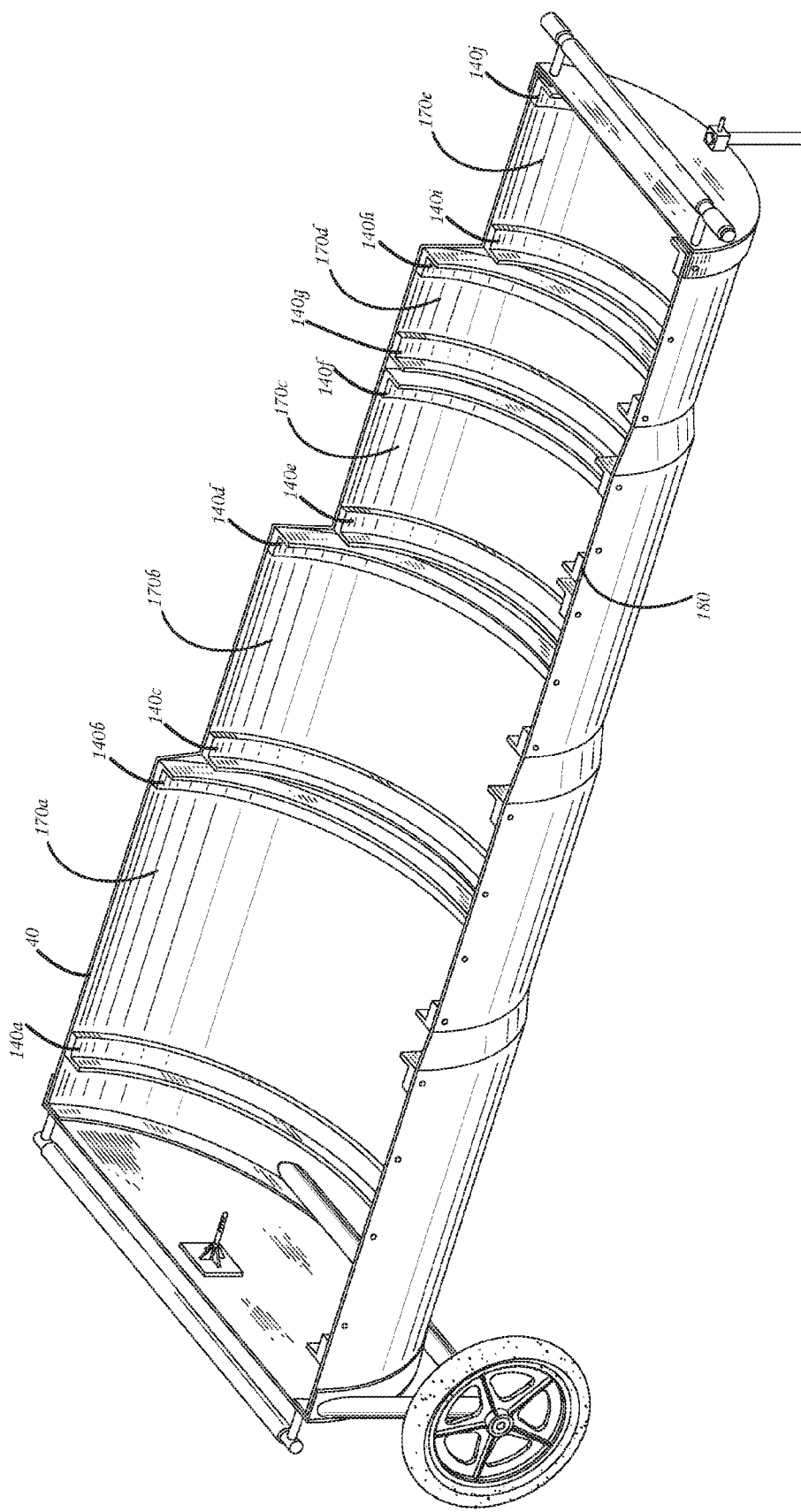
FIG. 8 is a perspective view of a hand truck illustrating a plurality of locating drum support strips according to an alternate embodiment.

Further, one will again notice in (FIG. 8) a plurality of semi-cylindrical drum compartments of verifying dimensions. Within each of the drum compartments 170a thru 170e as an alternate method of percussion drum control and storage a series of drum locating support strips 140a thru 140j respectively, are affixed to the inside surface of the body panel 40 thru the use of hook and loop fastening strips 180. These retaining drum support strips 140a thru 140j are constructed of a 90° L-shaped rubber or foam material and are placed into drum storage compartments 170a thru 170e while being attached with hook and loop fastening strips 180 within the body panel 40 to form their respective semi-circular shape. The retaining drum support strips 140a thru 140j are measured and cut to a desired length and should conform dimensionally and circumferentially to the inner surface of each drum storage compartment 170a thru 170e of varying dimensional diameters within the body panel 40. One who is typically a drummer and user of the hand truck begins loading of the percussion drums and grasps the bass drum from a configured drum set and then inserts the bass drum into the dimensionally correct storage compartment 170a within the hand truck placing the bass drum onto and into the drum retaining support strips 140a thru 140j securing the drum around the lower half independently. The user of the hand truck will continue in this fashion moving to and fro loading and inserting the drums one after another directly from the configured drum set into the predetermined and dimensionally correct compartments of the hand truck resting the drums into the retaining drum support strips 140a thru 140j until all of the drums from the configured drum set are loaded.

Figure 9:
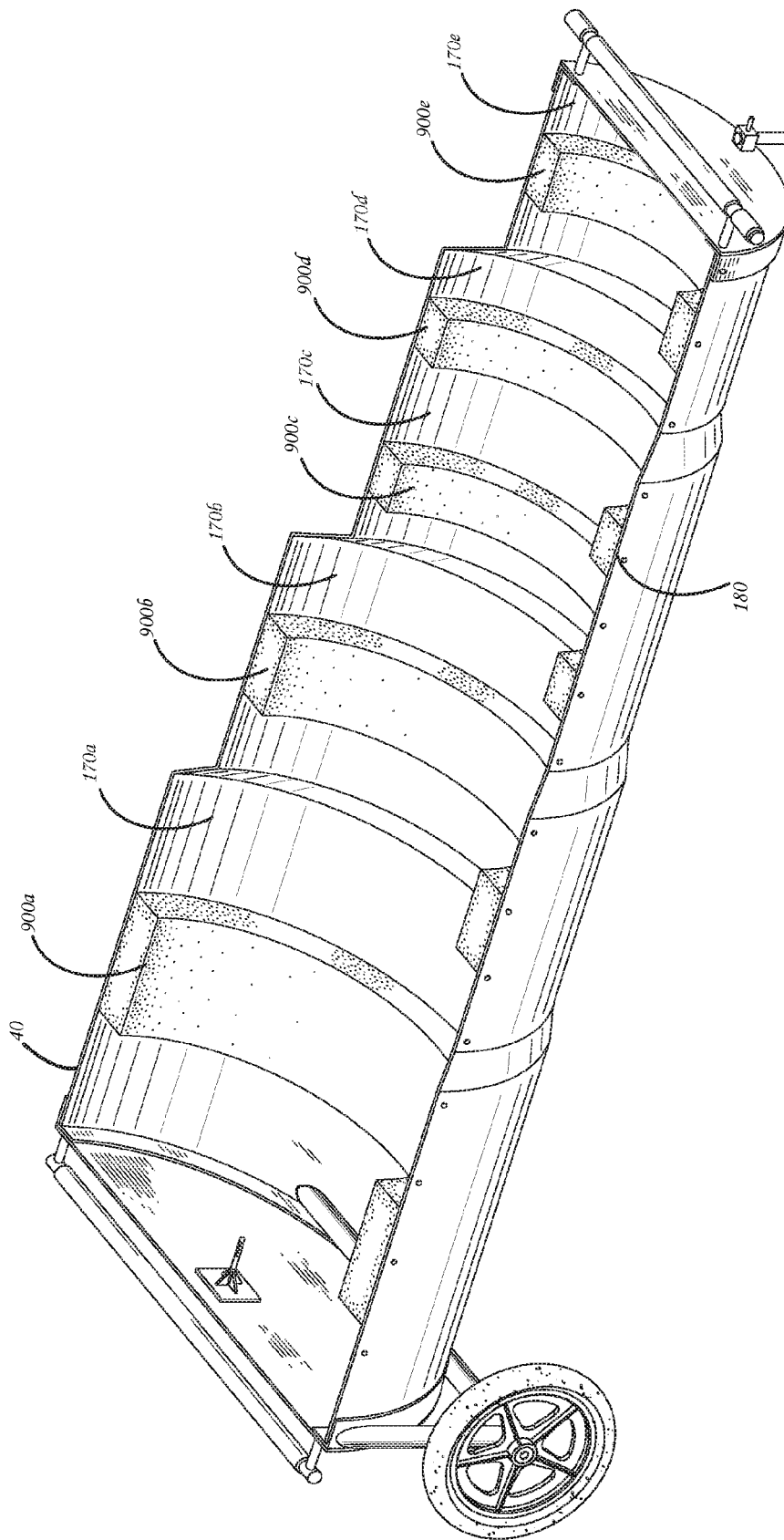
FIG. 9 is a perspective view of a hand truck illustrating a plurality of single drum support strips according to an alternate embodiment.

Succeedingly, as noted in (FIG. 9), depicted is a plurality of semi-cylindrical drum compartments of verifying dimensions. Within each of the drum compartments 170a thru 170e as an alternate method of percussion drum control and storage thru a series of drum support strips 900a thru 900e respectively, which are affixed to the inside surface of the body panel 40 thru the use of hook and loop fastening strips 180 to form semi-circular shape suitable for accepting placement of a predetermined percussion drum. These drum support strips 900a thru 900e are cut or machined from foam or rubber material and are placed into drum storage compartments 170a thru 170e while being attached with hook and loop fastening strips 180 within the body panel 40 to form their respective semi-circular shape. The inner dimensional diameter of drum support strips 900a thru 900e should be sized to accommodate the outer dimensional diameter of a preselected percussion drum of corresponding varying dimensions while conforming dimensionally and circumferentially to the inner surface of each drum storage compartment 170a thru 170e of varying dimensional diameters within body panel 40.

One who is typically a drummer and user of the hand truck begins loading of the percussion drums and grasps the bass drum from a configured drum set and then inserts the bass drum into the dimensionally correct storage compartment 170a within the hand truck placing the bass drum onto and into the drum support strips 900a thru 900e the drum around the center lower half independently. The user of the hand truck will continue in this fashion moving to and fro loading and inserting the drums one after another directly from the configured drum set into the predetermined and dimensionally correct compartments of the hand truck resting the drums into the drum support strips 900a thru 900e until all of the drums from the configured drum set are loaded.

Figure 10:
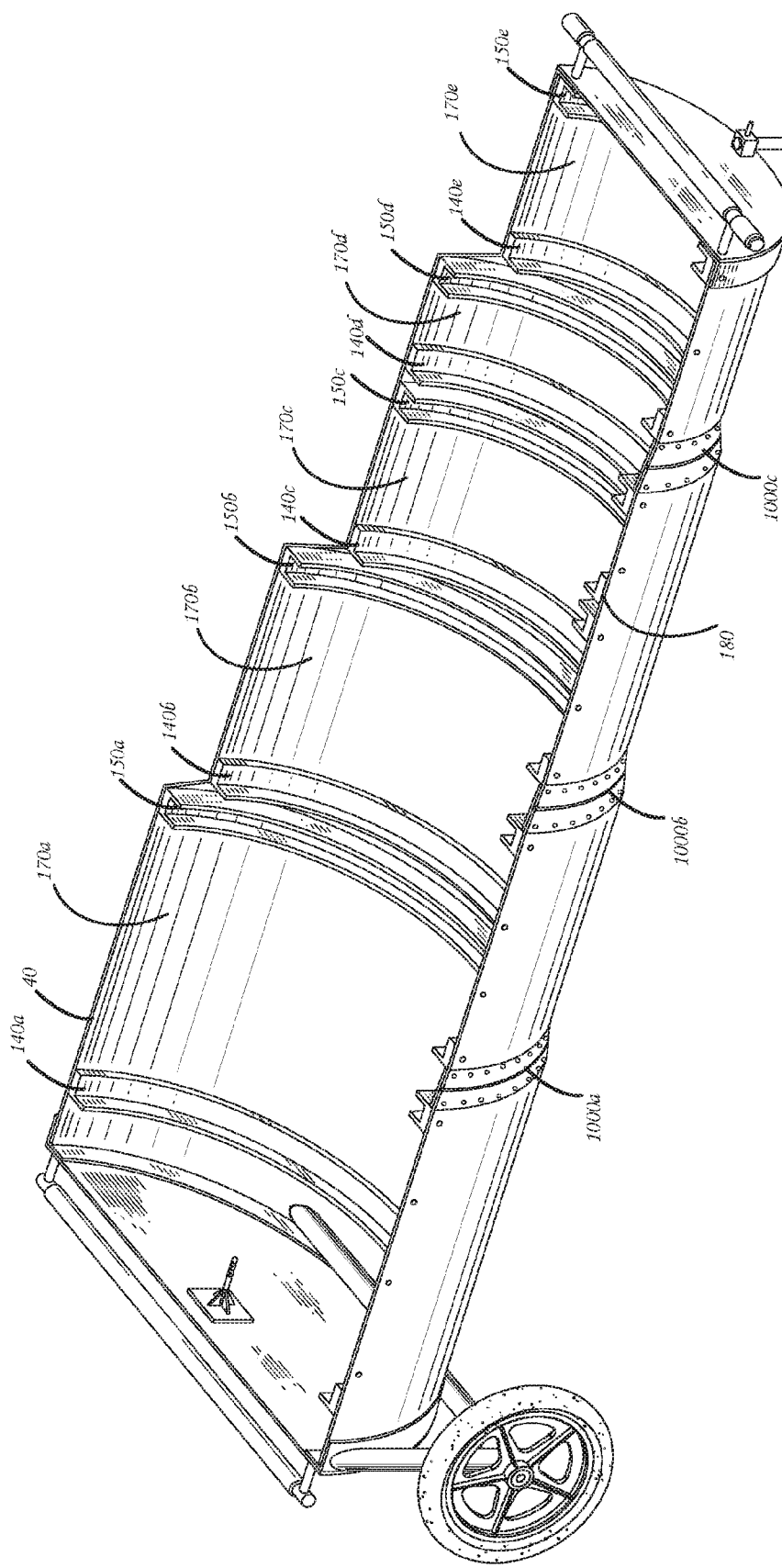
FIG. 10 is a perspective view of a hand truck illustrating a plurality of attached reduction trim pieces according to an alternate embodiment.

Next to be examined, is (FIG. 10) which illustrates an alternate body panel 40 comprised of a plurality of semi-cylindrical drum compartments 170a thru 170e of varying dimensional diameters attached together thru the use of reduction trim pieces 1120a thru 1120c along the body panel with the reduction trim pieces being attached on each end of an individual drum compartment(s) 170a thru 170e. The size of the reduction trim piece 1120a thru 1120c is equal to a dimensional reduction relevant to the outer dimensions of a predetermined drum locating or retaining support strip 140a thru 140e or 150a thru 150e respectively, that corresponds inwardly to the diameter of a predetermined percussion drum of the hand truck owner. A rectangular section of polyethylene is heated and formed into its semi-cylindrical shape then, once completed, joined with the appropriate reduction trim piece 1120a thru 1120c on each end which attach the individual sections together to comprise the drum storage compartments 170a thru 170e. This step is repeated until all of the drum storage compartments have been assembled then, the final body panel profile will become evident consisting of individually sized drum compartments 170a thru 170e of varying dimensional diameter from larger to smaller assembled to form a stepped-like pattern that enable a conversion of inside dimensions of the compartments from one predetermined size to the next usually from larger to smaller.

Figure 11:
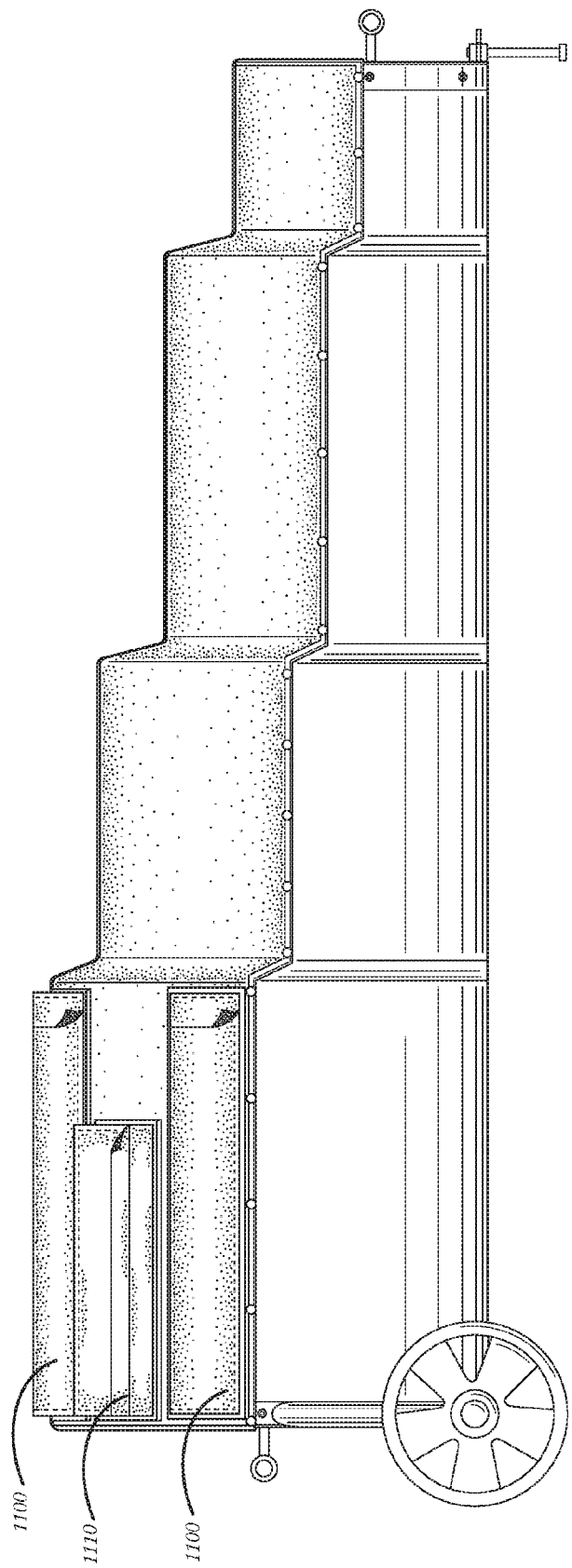
FIG. 11 is a side view of a hand truck illustrating drum accessory and bass pedal storage compartments comprised entirely of heavy cloth or canvas material.
Figure 12:
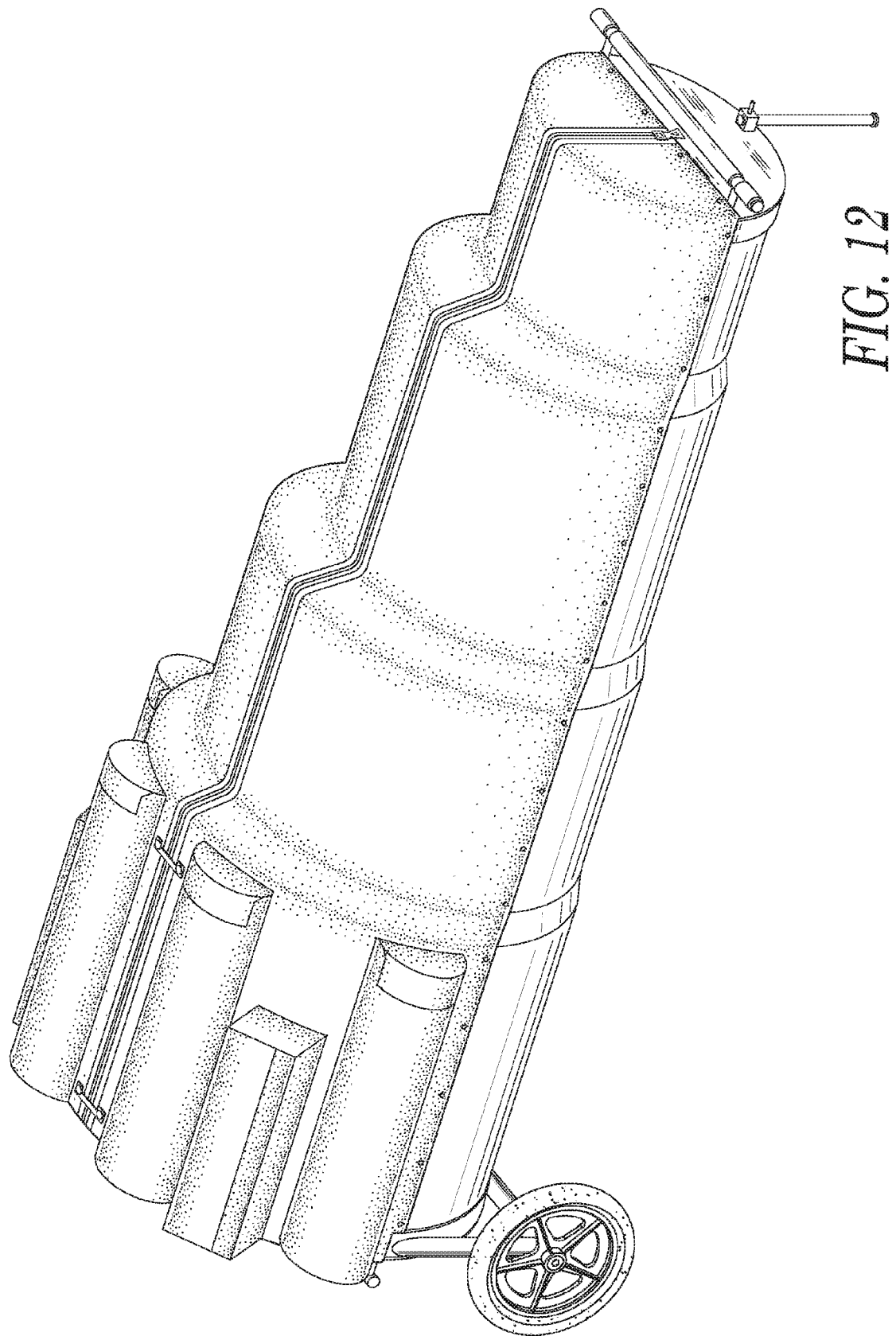
FIG. 12 is a perspective view of a hand drum truck.

Conclusively, (FIG. 11) illustrates a hand truck of the invention having drum accessory storage compartments 1300R1 thru 1300L2 (1300L1 and 1300L2 not shown) and bass drum pedal storage compartments 1310R thru 1310L (1310L not shown) comprised entirely of canvas or heavy cloth type material. The canvas or heavy cloth type storage compartments are semi-cylindrical along the upper half while have a flat portion along the bottom for form a type of flooring. These canvas or heavy cloth type storage compartments are cut from material then stitched together to form their respective shapes then attached to the hand truck cover thru the use of hook and loop fastening strips 180 sized to adequately accommodate storage of drum accessories or bass drum pedals from a percussion drum set and are arranged in a configuration identical to drum accessory storage compartments and bass drum pedal storage compartments of the first embodiment.

ADVANTAGES

From the above and previous descriptions a number of advantages of the hand truck for percussion drums and related accessories become evident:
(a). The design of the hand truck will offer the ability to move an entire drum set in one transport cycle. This in addition to the weight of the hand truck will significantly decrease the amount of physical effort and time necessary to transport an entire drum set.
(b). The hand truck generally allows for the transfer and loading of drums to and from the hand truck in a horizontal position with the drum support strips remaining stationary which will make loading and unloading quicker and easier.
(c). The design and materials of the hand truck provide excellent protection against the elements such as rain and snow for the percussion drums and related accessories as well as the hand truck itself.
(d). The semi-cylindrical unibody panel design along with polyethylene being the primary material, will make the hand truck rigid and durable in addition to complementing the weight and torsional characteristics so that the hand truck can resist bending and twisting in undesired manner while storing and transporting an entire drum set.
(e). The design of the hand truck lends itself to being heavier in weight at the front and lighter in weight at the rear. This configuration puts the majority of the weight over the front adjoining bracket and wheels while allowing the rear of the hand truck to be lighter due to its size and load thus allowing for easier movement and transport by the hand truck owner.
(f). With the use of aluminum and polyethylene the hand truck will be fairly simple and cost effective to manufacture and quantities of the these types of materials are quite plentiful.

CONCLUSION AND RAMIFICATIONS

Accordingly, one can see the hand truck for percussion drums and related hardware of the various embodiments can be employed to load, unload, transport and store an entire percussion drum set quickly and easily. In addition to the previous benefits, there are additional advantages in that:
(a). The loading, unloading, transport, as well as the setting up and tearing down of a percussion drum set and its related accessories before and after a percussion musical performance is extremely daunting. This labor-intensive task which is required for each performance is dreaded by most percussionists and greatly detracts from, and diminishes the appreciation and enjoyment of musical performances. Since the hand truck of the invention enables faster and easier loading, unloading, and transport of a given percussion drum set and its related accessories it contributes to, increases, and restores a greater appreciation and enjoyment of musical performances for the percussionist. This renewed appreciation and enjoyment of percussion musical performances will greatly enhance the esthetics related to percussion arts as a whole.
(b). The use of materials such as polyethylene and aluminum allow the use of various colors as well as the ability to manufacture a hand truck with colors that correspond to the hand truck users percussion drum set.
(C). The use of materials such as polyethylene and aluminum will allow various music or percussion related band logos, designs, or artwork to be engraved or fabricated onto the outer surface of the hand truck thus, making the hand truck more appealing to drumming musicians, which would promote in a sense, their own idealism or expression similar to their percussion music.
(d). being that these materials are recyclable for the most part, would appeal to great number of drumming musicians who are concerned about sustainability of the natural environment.

Although the description above contains many specificities, these should not be construed as limiting the scope of the embodiments but as merely providing illustrations of some of several embodiments.

I claim:

1. A hand truck for percussion drum set comprising:
a plurality of substantially semi-cylindrical plates;
a plurality of support strips being secured to a perimeter of said substantially semi-cylindrical plates to form a plurality of drum compartments;
a plurality of chamfer strips for joining an end of one of said plurality of substantially semi-cylindrical plates to an adjacent one of said plurality of substantially semi-cylindrical plates; and
a cover is removably attachable to said plurality of semi-cylindrical plates, wherein a plurality of drums are retained in said plurality of drum compartments.

2. The hand truck for percussion drum set of claim 1, further comprising:
a cymbal storage rod includes a mounting base and a cymbal storage rod, said cymbal storage rod includes a plurality isolator pads extending from a perimeter thereof, said cymbal storage rod extends from said mounting base, a plurality of V-shaped notches are formed in said cymbal storage rod, one of said plurality of isolator pads are located between two adjacent V-shaped notches of said plurality of V-shaped notches.

3. The hand truck for percussion drum set of claim 1 wherein:
said cover includes a first portion and a second portion, a one side of said first portion is removably jointed to one side of said second portion with at least one zipper, an opposing side of said first and second portions are removably attached to opposing edges of said plurality of semi-cylindrical plates.

4. The hand truck for percussion drum set of claim 1, further comprising:
a pair of wheels are rotatably retained adjacent a rear of said hand truck for percussion drum set; and
an adjustable support member is retained on a front of said hand truck for percussion drum set.

5. The hand truck for percussion drum set of claim 1, further comprising:
a pull handle is attached to at least one of a rear of said hand truck for percussion drum set and a front of said hand truck for percussion drum set.

6. The hand truck for percussion drum set of claim 1, further comprising:
at least one accessory storage compartment is attached to an outside surface of said cover.

7. A hand truck for percussion drum set comprising:
a plurality of substantially semi-cylindrical plates;
a plurality of support strips being secured to a perimeter of said substantially semi-cylindrical plates to form a plurality of drum compartments;
a plurality of chamfer strips for joining an end of one of said plurality of substantially semi-cylindrical plates to an adjacent one of said plurality of substantially semi-cylindrical plates;
a front plate is attached to a front end of said plurality of substantially semi-cylindrical plates, a rear plate is attached to a rear end of said plurality of substantially semi-cylindrical plates; and
a cover having a substantially semi-cylindrical cross section, said cover being removably attachable to said plurality of semi-cylindrical plates, wherein a plurality of drums are retained in said plurality of drum compartments.

8. The hand truck for percussion drum set of claim 7, further comprising:
a cymbal storage rod includes a mounting base and a cymbal storage rod, said cymbal storage rod includes a plurality isolator pads extending from a perimeter thereof, said cymbal storage rod extends from said mounting base, a plurality of V-shaped notches are formed in said cymbal storage rod, one of said plurality of isolator pads are located between two adjacent V-shaped notches of said plurality of V-shaped notches.

9. The hand truck for percussion drum set of claim 7 wherein:
said cover includes a first portion and a second portion, a one side of said first portion is removably jointed to one side of said second portion with at least one zipper, an opposing side of said first and second portions are removably attached to opposing edges of said plurality of semi-cylindrical plates.

10. The hand truck for percussion drum set of claim 7, further comprising:
a pair of wheels are rotatably retained adjacent said rear plate; and
an adjustable support member is retained on said front plate.

11. The hand truck for percussion drum set of claim 7, further comprising:
a pull handle is attached to at least one of said rear plate and said front plate.

12. The hand truck for percussion drum set of claim 7, further comprising:
at least one accessory storage compartment is attached to an outside surface of said cover.

13. A hand truck for percussion drum set comprising:
a plurality of substantially semi-cylindrical plates, at least two of said substantially semi-cylindrical plates having at least two different lengths;
a plurality of support strips being secured to a perimeter of said substantially semi-cylindrical plates to form a plurality of drum compartments, at least two of said drum compartments having at least two different internal volumes;
a plurality of chamfer strips for joining an end of one of said plurality of substantially semi-cylindrical plates to an adjacent one of said plurality of substantially semi-cylindrical plates;
a front plate is attached to a front end of said plurality of substantially semi-cylindrical plates, a rear plate is attached to a rear end of said plurality of substantially semi-cylindrical plates; and
a cover having a substantially semi-cylindrical cross section, said cover being removably attachable to said plurality of semi-cylindrical plates, wherein a plurality of drums are retained in said plurality of drum compartments.

14. The hand truck for percussion drum set of claim 13, further comprising:
a cymbal storage rod includes a mounting base and a cymbal storage rod, said cymbal storage rod includes a plurality isolator pads extending from a perimeter thereof, said cymbal storage rod extends from said mounting base, a plurality of V-shaped notches are formed in said cymbal storage rod, one of said plurality of isolator pads are located between two adjacent V-shaped notches of said plurality of V-shaped notches.

15. The hand truck for percussion drum set of claim 13 wherein:
  said cover includes a first portion and a second portion, a one side of said first portion is removably jointed to one side of said second portion with at least one zipper, an opposing side of said first and second portions are removably attached to opposing edges of said plurality of semi-cylindrical plates.

16. The hand truck for percussion drum set of claim 13, further comprising:
  a pair of wheels are rotatably retained adjacent said rear plate; and
  an adjustable support member is retained on said front plate.

17. The hand truck for percussion drum set of claim 13, further comprising:
  a pull handle is attached to at least one of said rear plate and said front plate.

18. The hand truck for percussion drum set of claim 13, further comprising:
  at least one accessory storage compartment is attached to an outside surface of said cover.

\* \* \* \* \*